US008861588B2

(12) United States Patent
Nguyen et al.

(10) Patent No.: US 8,861,588 B2
(45) Date of Patent: Oct. 14, 2014

(54) APPARATUS AND METHOD FOR SAMPLING AND RECONSTRUCTION OF WIDE BANDWIDTH SIGNALS BELOW NYQUIST RATE

(75) Inventors: Lam Huy Nguyen, Laurel, MD (US); Trac D Tran, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 35 days.

(21) Appl. No.: 13/416,062

(22) Filed: Mar. 9, 2012

(65) Prior Publication Data
US 2012/0250748 A1 Oct. 4, 2012

Related U.S. Application Data

(60) Provisional application No. 61/471,227, filed on Apr. 4, 2011.

(51) Int. Cl.
*H04B 1/66* (2006.01)
(52) U.S. Cl.
USPC ............. 375/240; 375/24; 375/224; 375/316; 341/155
(58) Field of Classification Search
CPC .................... H04N 2201/0414; H03M 1/1265; G01S 13/88
USPC ............................ 375/240, 224, 316; 341/155
See application file for complete search history.

(56) References Cited

U.S. PATENT DOCUMENTS

| 5,673,050 A | 9/1997 | Moussally et al. |
| 5,805,098 A | 9/1998 | McCorkle |
| 7,796,829 B2 | 9/2010 | Nguyen |
| 2006/0132345 A1* | 6/2006 | Raz ................................ 341/155 |
| 2008/0129560 A1* | 6/2008 | Baraniuk et al. ................ 341/87 |
| 2010/0302086 A1* | 12/2010 | Dudgeon et al. ............... 341/155 |
| 2010/0310011 A1* | 12/2010 | Sexton et al. ................... 375/316 |
| 2012/0112957 A1 | 5/2012 | Nguyen et al. |

OTHER PUBLICATIONS

Lam Nguyen, "Signal and Image Processing Algorithms for the U.S. Army Research Laboratory Ultra-wideband (UWB) Synchronous Impulse Reconstruction (SIRE) Radar") in view of Dudgeon et al. (US Patent Application Publication No. 2010/0302086.*
Lam Nguyen, "Signal and Image Processing Algorithms for the U.S. Army Research Laboratory Ultra-wideband (UWB) Synchronous Impulse Reconstruction (SIRE) Radar", Apr. 2009, Army Research Laboratory, ARL-TR-4784, pp. 1-58.*

(Continued)

*Primary Examiner* — Sam K Ahn
*Assistant Examiner* — Fabricio R Murillo Garcia
(74) *Attorney, Agent, or Firm* — Lawrence E. Anderson

(57) ABSTRACT

A method and system of reconstructing data signals from one of incomplete measurements comprising a receiver for receiving data signals, an ADC system operatively connected to the receiver that digitizes the received data signal at a slower rate than the Nyquist rate to obtain sparse measurements; first and second dictionaries comprising a plurality of time shifted responses recovered from the data signal; the first dictionary comprising time shifted versions of the previously observed data signals which are sampled at or above the Nyquist minimum sample rate; the second dictionary comprising time shifted versions are sampled below the Nyquist minimum, and at least one processor for reconstruction of the waveform signals by transforming the sub-Nyquist digitized output using the first and second dictionaries to produce the data signal.

20 Claims, 26 Drawing Sheets
(25 of 26 Drawing Sheet(s) Filed in Color)

(56) References Cited

OTHER PUBLICATIONS

Real-Time Versus Equivalent-Time SamplingTektronix Application Note, http://www2.tek.com/cmswpt/tidetails.lotr?ct=TI&cs=Application+Note&ci=14295&lc=EN. Jan. 1, 2001.
Lam Nguyen, "Signal and Image Processing Algorithms for the U.S Army Research Laboratory Ultra-wideband (UWB) Synchronous Impulse Reconstruction (SIRE) Radar," Army Research Laboratory Technical Report, ARL-TR-4784, Apr. 2009.
Nguyen, L. H. Ton, T. T.; Wong, D. C.; Ressler, M. A. Signal Processing Techniques for Forward Imaging Using Ultrawideband Synthetic Aperture Radar. Proceedings of SPIE 5083, 505, (2003).
Thong T. Do, Trac D. Tran and Lu Gan, "Fast compressive sampling using structurally random matrices", Proc. of ICASSP 2008, Las Vegas, Apr. 2008.
Ressler, Marc, et al., "The Army Research Laboratory (ARL) Synchronous Impulse Reconstruction (SIRE} Forward-Looking Radar," Proceedings of SPIE, Unmanned Systems Technology IX, vol. 6561. May 2007.
M. A. T. Figueiredo, R. D. Nowak, and S. J. Wright, "Gradient projection for sparse reconstruction: Application to compressed sensing and other inverse problems," IEEE Journal of Selected Topics in Signal Processing, Special Issue on Convex Optimization Methods for Signal Processing, vol. 1, No. 4, pp. 586-598 (Apr. 2007).
J. Tropp and A. Gilbert, "Signal recovery from random measurements via orthogonal matching pursuit," IEEE Trans. on Information Theory, vol. 53, No. 12, pp. 4655-4666 (Dec. 2007)(.
E. Candès and T. Tao, "Decoding by linear programming," IEEE Trans. on Information Theory, vol. 51, No. 12, pp. 4203-4215 (Dec. 2005).
D. Needell and R. Vershynin, "Signal recovery from incomplete and inaccurate measurements via regularized orthogonal matching pursuit," IEEE Journal of Selected Topics in Signal Processing, vol. 4, pp. 310-316 (Apr. 2010).
W. Dai and O. Milenkovic, "Subspace pursuit for compressive sensing: Closing the gap between performance and complexity," IEEE Trans. on Information Theory, vol. 55, pp. 2230-2249 (May 2009).
T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (Oct. 2008).
S. Becker, et al., "NESTA: a Fast and Accurate First-order Method for Sparse Recovery," SIAM J. on Imaging Sciences, 4, 1-39 (2011).
E. J. Candès and M. Wakin, "An introduction to compressive sampling," IEEE Signal Processing Magazine, vol. 25, No. 2, pp. 21-30, Mar. 2008.
Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.
Nguyen, L.; Wong, D.; Ressler, M.; Koenig, F.; Stanton, B.; Smith, G.; Sichina, J.; Kappra, K. "Obstacle Avoidance and Concealed Target Detection Using the Army Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.
Nguyen, L.; Ressler, M.; Sichina, J. "Sensing Through the Wall Imaging Using the Army Research Lab Ultra-wideband Synchronous Impulse Reconstruction (UWB SIRE) Radar," Proceedings of SPIE, Radar Sensor Technology XII, vol. 6947, Apr. 2008.
Nguyen, L.; Soumekh, M. "System Trade Analysis for an Ultra-wideband Forward Imaging Radar," Proceedings of SPIE, Unmanned Systems Technology VIII, vol. 6230, 2006.
Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1, 2004.
Nguyen, L.; Soumekh, M. "Suppression of Radio Frequency Interference (RFI) for Equivalent Time-sampling Ultra-wideband wideband Radar," Proceedings of SPIE, Algorithms for Synthetic Aperture Radar Imagery XII, 2005.
McCorkle, J.; Nguyen, L. "Focusing of Dispersive Targets Using Synthetic Aperture Radar," ARL-TR-305; U.S. Army Research Laboratory: Adelphi, MD, Aug. 1994.
Nguyen, L. "Signal Processing Technique to Remove Signature Distortion in ARLSynchronous Impulse Reconstruction (SIRE) Ultra-Wideband (UWB) Radar;" ARL-TR-4404; U.S. Army Research Laboratory: Adelphi, MD, Mar. 2008.
John W. McCorkle, "Focusing of Synthetic Aperture Ultra Wideband Data," IEEE Int'l Conf on Systems Engineering, Aug. 1992, p. 1-5.
M. Ressler et al., "The Army Research Laboratory Ultra-Wideband Testbed Radars," IEEE 1995 International Radar Conference, Alexandria, Va., May 1995.

* cited by examiner

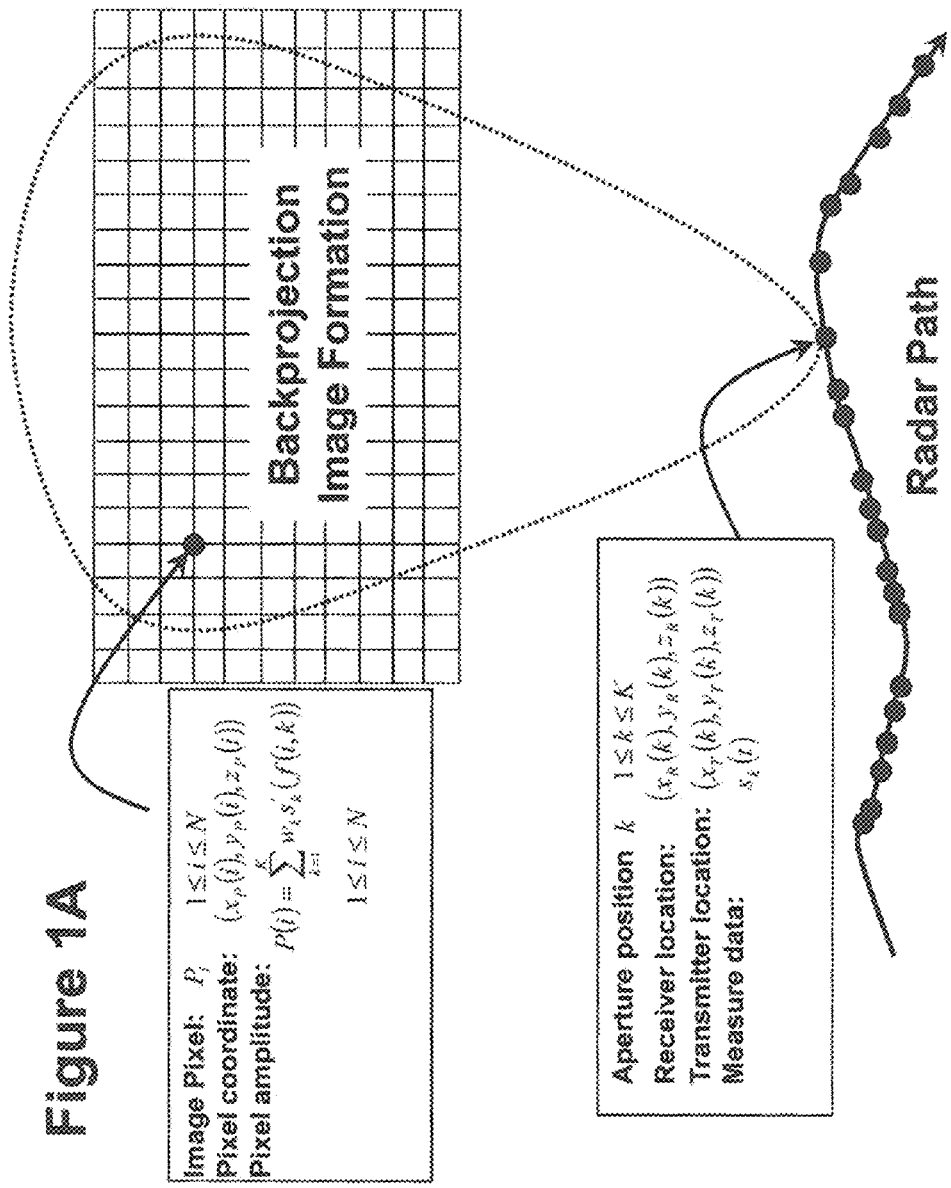

UWB Radar Imaging Geometry and Mosaic Imaging

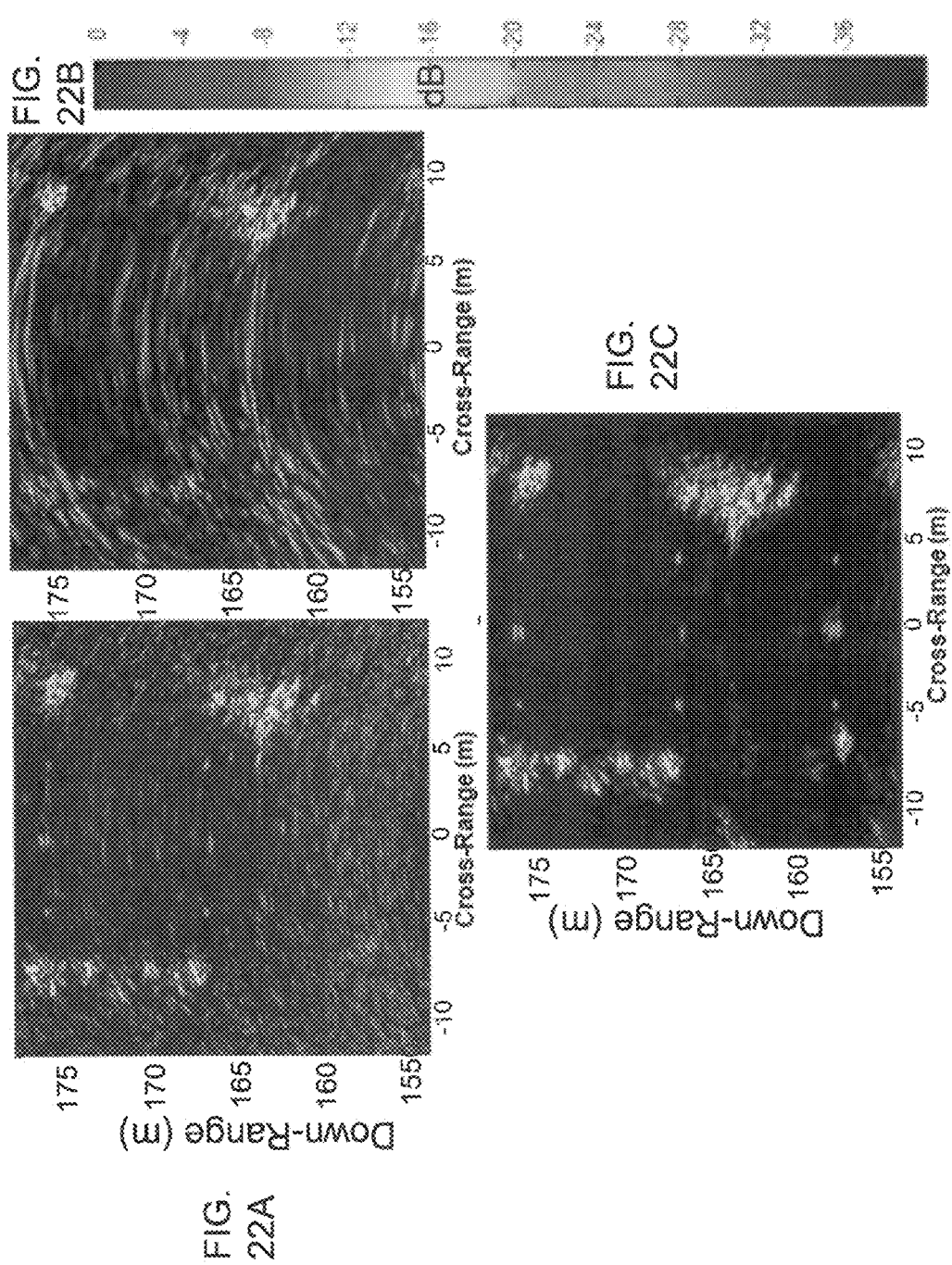

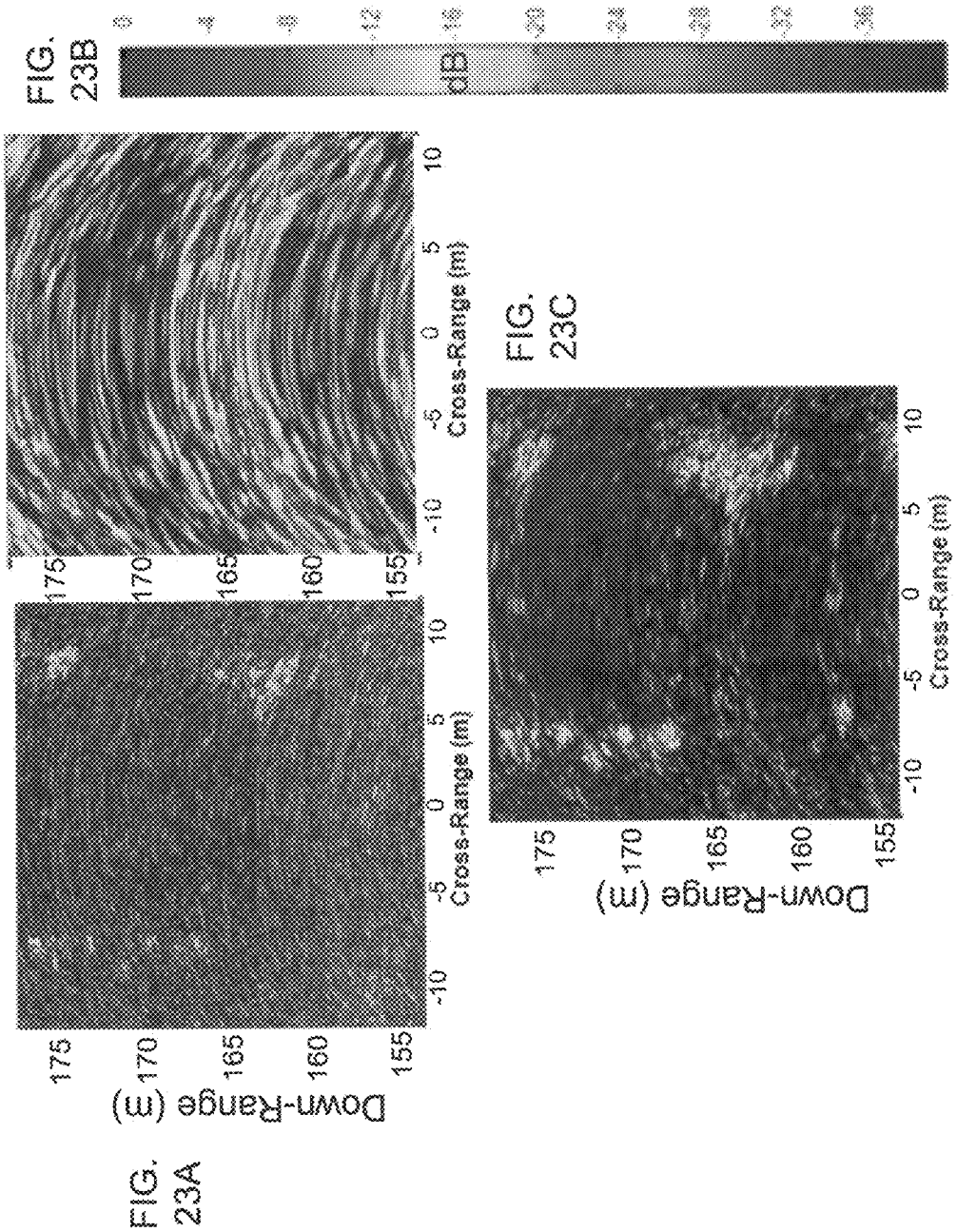

APPARATUS AND METHOD FOR SAMPLING AND RECONSTRUCTION OF WIDE BANDWIDTH SIGNALS BELOW NYQUIST RATE

CROSS REFERENCE TO RELATED APPLICATIONS

This application claims the benefit of priority to U.S. Provisional Application No. 61/471,227 filed Apr. 4, 2011.

STATEMENT OF GOVERNMENT INTEREST

The embodiments herein may be manufactured, used, and/or licensed by or for the United States Government without the payment of royalties thereon.

BACKGROUND OF THE INVENTION

The present invention relates to the generation of images from projection measurements. Examples of images generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. The many echo waveforms received at the different antenna positions are post-processed to resolve the target. SAR can be implemented by moving one or more antennas over relatively immobile targets, by placing multiple stationary antennas over a relatively large area, or combinations thereof. A further example of images generated from projection measurements are ISAR (inverse SAR) systems, which image objects and many features on the ground from satellites, aircraft, vehicles or any other moving platform. SAR and ISAR systems are used in detecting, locating and sometimes identifying ships, ground vehicles, mines, buried pipes, roadway faults, tunnels, leaking buried pipes, etc., as well as discovering and measuring geological features, forest features, mining volumes, etc., and general mapping. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms; echocardiograms, x-ray CAT (computer-aided tomography) equipment and MRI (magnetic resonance imaging) equipment.

FIG. 1A illustrates an example utilizing the basic concept of the backprojection imaging algorithm. The radar is mounted on a moving platform. It transmits radar signals to illuminate the area of interest and receives return signals from the area. Using the motion of the platform, the radar collects K data records along its path (or aperture). In general the aperture could be a line, a curve, a circle, or any arbitrary shape. The receiving element k from the aperture is located at the coordinate $(x_R(k), y_R(k), z_R(k))$. For bistatic radar (the transmitting antenna is separate from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(A), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, an imaging grid is formed that consists of N image pixels. Each pixel $P_i$ from the imaging grid is located at coordinate $(x_p(i), y_p(i), z_p(i))$. The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body. Each measured range profile $s_k(t)$ is corrected for the $R^2$ propagation loss, i.e. $s_k'(t) = R^2(r)s_k(t)$, where $$R(t) = \frac{ct}{2}$$

and $c=2.997\ e^8$ m/sec. The backprojection value at pixel P(i) is $$P(i) = \sum_{k=1}^{K} w_k s_k'(f(i,k)), \ 1 \leq i \leq N \tag{1}$$

where $w_k$ is the weight factor and f(i,k) is the delay index to $s_k'(t)$ necessary to coherently integrate the value for pixel P(i) from the measured data at receiving element k.

The index is computed using the round-trip distance between the transmitting element, the target point forming the image (pixel), and the receiving element. The transmitting element is located at the coordinate $(x_T(k), y_T(k), z_T(k))$. The distance between the transmitting element and the target point forming the image pixel P(i) is:

$$d_1(i,k) = \sqrt{[(x_T(k) - x_P(i))]^2 + [(y_T(k) - y_P(i))]^2 + [(z_T(k) - z_P(i))]^2} \tag{2}$$

The distance between the receiving element and the target point forming the image pixel P(i) is $$d_2(i,k) = \sqrt{[(x_R(k) - x_P(i))]^2 + [(y_R(k) - y_P(i))]^2 + [(z_R(k) - z_P(i))]^2} \tag{3}$$

The total distance is $$d(i,k) = d_1(i,k) + d_2(i,k) \tag{4}$$

The delay index is $$f(i,k) = \frac{d(i,k)}{c} \tag{5}$$

FIG. 1B illustrates a typical imaging geometry for an ultra wide band forward looking (e.g., SIRE) radar. In this case, the radar is configured in forward-looking mode instead of side-looking mode as illustrated in FIG. 1A. In this forward-looking mode, the radar travels and radiates energy in the same direction. The general backprojection algorithm applies to the embodiment of FIG. 1B. As seen in FIG. 1B, the radar travels in parallel to the x-axis. The backprojection image formation is combined with the mosaic technique. The large area image is divided into sub-images. The size of each sub-image may be, for example, 25 m in cross-range and only 2 m in down-range (x-axis direction). The radar starts at coordinate A, which is 20 m from sub-image 1, and illuminates the entire image area to the right.

The height of the vehicle mounted radar may be approximately 2 m from the ground. The imaging center may be located at approximately 20 in from the radar, but for various target resolutions, the imaging centers may be located at various ranges. For simplicity, a fixed range is used for to form imagery and the motion of the vehicle is not shown. In practice, however, imagery is formed using the physical aperture of the antenna array and the synthetic aperture (SAR) generated by the forward motion of the vehicle. This two-dimensional aperture gives not only the crossrange resolution (from physical aperture of the antenna array) but also the height resolution (from the forward motion) and thus results in a 3-dimensional image (see, Nguyen, L. H.; Ton, T. T.; Wong, D. C.; Ressler, M. A. Signal Processing Techniques for Forward Imaging Using Ultrawideband Synthetic Aperture Radar. *Proceedings of SPIE* 5083, 505, (2003), hereby incorporated by reference. This approach also provides integration to achieve a better signal-to-noise ratio in the resulting image.

The following is a description of the platform 10 in FIG. 1B as it passes four sequential positions $10^A$, $10^B$ $10^C$ & $10^D$ located at x-coordinates A, B, C & D, respectively. The formation of the first sub-image begins when platform 10 is at the coordinate A, 20 meters from the block labeled "$1^{st}$ sub-image." As platform 10 travels in the x direction (as shown in FIG. 1B), signals emitted from platform 10 illuminates an entire image area to the right of platform 10, and the reflected signals are received by an array of 16 physical receiving antennas 11 positioned on the front of the platform 10. Formation of the first sub-image ends when platform 10 reaches coordinate C, at approximately 8 m from the block labeled "$1^{st}$ sub-image." Accordingly, the radar signal data for the first (full-resolution) sub-image is received as radar platform 10 travels a distance of 12 meters (20 m–8 m=12 m) from coordinates A to C, for formation of a two dimensional (2D) aperture.

The distance traveled during the formation of the two-dimensional (2-D) aperture is represented by an arrow in FIG. 1B labeled "Aperture 1." When the platform 10 reaches coordinate B, a distance of 2 meters from coordinate A in FIG. 1B, the formation of the "$2^{nd}$ sub-image" begins, and as the platform 10 travels to coordinate D, it uses the received data to form a second 2-D aperture. The distance traveled by platform 10 is represented by an arrow in FIG. 1B labeled "Aperture 2." Note that the two apertures are overlapped by 10 m and the second aperture is "advanced" by 2 m with respect to the first aperture. Sub-images 1 and 2 are formed from the 2-D apertures using the same length of travel (12 meters) of the radar. This process is applied to ensure that image pixels have almost the same (within a specified tolerance) resolution across the entire large area. The sub-images are formed from the radar range profiles using the back-projection algorithm.

FIG. 2 schematically diagrams the back-projection algorithm applied to form a Sub-image. The procedure mathematically described with respect to FIG. 1A in the above paragraphs may also be applied to this imaging scenario. In this case, the radar aperture is a rectangular array that is formed by an array of 16 receiving elements (that spans 2 meters) and the forward motion of the platform (12 meter for forming each sub-image). The imaging grid in this case is defined as a rectangular array of 25×2 meter. Further details may be found in U.S. Pat. No. 7,796,829, hereby incorporated by reference.

Many applications such as radar and communication systems have been exploiting features that wide-bandwidth signals offer. However, the implementation of front-end receivers to directly digitize these wide-bandwidth signals requires that the analog to digital converter (ADC) digitize the wide-bandwidth signals at a frequency above the minimum Nyquist rate. According to Wikipedia, the Nyquist theorem shows that an analog signal can be perfectly reconstructed from an infinite sequence of samples if the sampling rate exceeds 2B samples per second where B is the highest frequency of the original signal. In the case of time-domain impulse-based Ultra-Wideband (UWB) radar, to be above the Nyquist rate the clock speed of the front-end analog-to-digital converter (ADC) must be higher than twice the highest frequency content of the wide-bandwidth signal having a bandwidth from 300 MHz to 3000 MHz. In practice, the received radar data is directly digitized at an equivalent sampling rate of 7.720 Giga-samples/sec, which is slightly higher than the required Nyquist sampling rate of at least 6 Giga-samples/sec.

Because of this challenge, state-of-the-art systems employ various time-equivalent sampling techniques that allow the reconstruction of the Wideband-signals from slower sampling rates. These equivalent-time sampling techniques are based on the assumption that a signal waveform is repeatable for many observations. By acquiring the same signal waveform at different phase delays with sub-Nyquist sampling rate, the signal waveform can be reconstructed by interleaving data from individual observations. In other words, these time-equivalent techniques depend on many observations of the same single waveform of interest via interleaving data from individual observations to reconstruct the original information. These techniques do not work if there is only one chance to observe the signal, or the acquired signal is not repeatable from one observation to the next. In addition, since it takes many observations of a signal waveform in order to complete one acquisition cycle (hence the term equivalent time), the effective data acquisition rate is much slower than the real-time data acquisition, which uses analog-to-digital converters (ADCs) that operate at above Nyquist rate. The equivalent-time data acquisition results in many disadvantages such as slower data acquisition time, lower pulse repetition rate (PRF), lower average power, etc. In several practical applications, the assumption that a signal is repeatable for many measurements might not be practical or not even realizable.

In the case of Ultra-Wideband (UWB) radar, which has advantageous penetration capability due to low-frequency contents and the high resolution due to the wide-bandwidth of the transmit signals, a technique referred to as synchronous impulse reconstruction (SIRE) sampling technique has employed an equivalent-time sampling technique that allows the reconstruction of wide-bandwidth signal using analog-to-digital converters (ADCs) operating under the Nyquist rate. The ARL SIRE radar system employs an Analog Devices 12-bit ADC to digitize the returned radar signals. However, the ADC is clocked at the system clock rate of 40 MHz. From the well-known sampling theory, it is not possible to reconstruct the Wide Bandwidth signal (300 Mhz to 3000 Mhz) since the clock rate of the ADC is much slower than the required minimum Nyquist sampling rate (in this case 6000 MHz). However, by using the synchronous time-equivalent sampling technique a much higher effective sampling rate is achieved. FIG. 4 provides a graphical representation of the SIRE acquisition technique. Further details are described in Nguyen, L., "Signal and Image Processing Algorithms for the U.S. Army Research Laboratory Ultra-wideband (UWB) Synchronous Impulse Reconstruction (SIRE) radar," Army Research Laboratory Technical Report, ARL. TR-4784, April 2009, hereby incorporated by reference, and Ressler, Marc, et al., "The Army Research Laboratory (ARL) Synchronous Impulse Reconstruction (SIRE) Forward-Looking Radar," Proceedings of SPIE, Unmanned Systems Technology IX, Vol. 6561. May 2007, hereby incorporated by reference.

The analog-to-digital converter (ADC) sampling period is $\Delta_i$; the value of this parameter in FIG. 4 is 25 ns, which corresponds to the A/D sampling rate of 40 MHz. The number of samples for each range profile is denoted by N, which is equal to 7 in our current configuration. This value corresponds to a range swath of 26 m. The system pulse repetition frequency (PRF) is 1 MHz. The system pulse repetition interval (PRI)—the inverse of PRF—is 1 ms. Each aliased (sub-Nyquist sampling) radar record is measured M times (1024 in the example of FIG. 4) and they are integrated to achieve higher signal-to-noise level. After summing M repeated measurements of the same range profile, the first range (fast-time) bin is increased by $\Delta$. Thus, the next group of M range profiles are digitized with a timing offset of $\Delta$ with respect to the transmit pulse. The parameter $\Delta$ represents a time sample spacing that satisfies the Nyquist criterion for the transmitted radar signal. This time sample spacing is 129.53 ps, which corresponds to a sampling rate of 7.72 GHz. This effective sampling rate is sufficient for the wide-bandwidth radar signal (300 MHz-3000 MHz). The number of interleaved samples is $$\kappa = \frac{\Delta_i}{\Delta},$$

which is 193 in FIG. 4. After K groups of M pulses are transmitted and the return signals are digitized and summed by the Xilinx Spartan 3 field-programmable gate array (FPGA), the result is a raw radar record of N·K samples with an equivalence of fast sample spacing of $\Delta$. The total time to complete one data acquisition cycle is K·M·PRI, which is 197.6 ms in this case. It should be noted that during the entire data acquisition cycle period (197.6 ms), the relative position between the radar and the targets is assumed to be stationary.

As previously mentioned, the advantage of the equivalent-time sampling technique is that it relieves the clock rate requirements for the ADCs. However, there are two major problems. First, the data acquisition time has been significantly increased. Second, the technique is based on the assumption that the signal is the same from one observation to the next. In this case the radar and all targets in the scene must be stationary during the entire data acquisition cycle. If this condition is met, the received signal will be perfectly reconstructed by interleaving the data from many returned waveforms from many observations. However, this assumption does not often hold in practice since the relative position between the radar and the targets is no longer negligible during the data acquisition cycle due to the motion of the radar platform. This is even worse for the forward-looking radar geometry since the radar in this case moves toward the imaging area. Even with the slow speed of the platform (1 mile per hour), the relative motion between the radar and the targets during the data acquisition cycle results in severe phase and shape distortions in the reconstructed signal. This in turn results in poor focus quality and low signal-to-noise level in SAR imagery. Although some of these artifacts can be corrected by signal processing algorithms, this time-equivalent technique would definitely limit the maximum speed of the radar platform.

The SIRE sampling technique, a modified and enhanced version of the equivalent-time sampling technique used in commercial digital storage oscilloscopes and other radar systems, allows the employment of inexpensive A/D converters to digitize the wide-bandwidth signals. However, like other equivalent-time sampling techniques, the basic assumption is that the signal is repeatable from one observation to the next. Thus, by acquiring the same waveform with many observations with different phase offsets, the under-sampled data records are then interleaved for the reconstruction of the equivalent over-sampled data record. This results in many side effects that include the distortion of the captured waveform due to the relative motion of the radar and the target during the data acquisition cycle (returned radar waveforms have been changed during the acquisition cycle). In addition, the equivalent-time data acquisition translates to lower average power and lower effective pulse repetition frequency (PRF) for the SAR system. Other state-of-the-art implementations include the use of multiple ADCs in a parallel configuration to increase the effective sampling rate and reduce the data acquisition time. However, the use of parallel ADCs significantly increases the size, weight, power, and cost of the receiver.

SUMMARY OF THE INVENTION

A preferred embodiment of the present invention comprises a sparse-recovery model-based (SMB) sub-Nyquist sampling and reconstruction scheme. SMB allows the reconstruction of a wideband signal that is sampled at a much slower rate than Nyquist's in real-time (with a single observation). One advantage of this technique is that the high clock rate of the front-end analog-to-digital converter (ADC) can be lowered. By lowering the required clock rate of the ADC, there is significant reduction in the size, weight, power, and cost for the implementation of the receiver. This is important for a system with multiple receiving channels (e.g., the ARL UWB radar system has 16 receiving channels), or a network of sensors. Another advantage of the preferred embodiment technique is that it also offers data compression. This technique allows each receiver to digitize a signal waveform at a much slower rate, reducing the required transmission bandwidth, especially for the implementation of networks of sensors.

The sparsity-driven model-based (SMB) sub-Nyquist sampling and reconstruction technique of the preferred embodiment is a real-time sampling technique, not equivalent-time. That means the sampling of the signal is performed using only a single observation at a sampling rate which is much slower than the required sampling rate (Nyquist) via a single slow inexpensive ADC. After this real-time sub-Nyquist sampling is performed, the signal is reconstructed using the preferred embodiment SMB reconstruction technique.

The preferred embodiment sparsity-driven model-based (SMB) sub-Nyquist sampling and reconstruction technique allows the wideband signals to be sampled at a much slower rate than the required minimum sampling rate. This preferred embodiment technique is a real-time sampling scheme, not equivalent-time, which means the sampling of the signal is performed using only a single observation, at a sampling rate much slower than the required sampling rate (Nyquist), using a slow inexpensive off-the-shelf ADC. After the real-time sub-Nyquist sampling is performed, the signal is reconstructed using the invented sparsity-driven reconstruction technique.

The first advantage of this technique is that we can lower the requirement of the high clock rate of the front-end ADC.

By lowering the required clock rate of the ADC, this would result in the significant reduction in the size, weight, power, and cost for the implementation the receiver. This is even more important for a system with multiple receiving channels (such as the ARL UWB radar system), or a network of sensors. Another advantage is that this technique also naturally offers the data compression feature, allowing each receiver to digitize a signal waveform at a much slower rate which leads to a tremendous reduction in the required transmission bandwidth, especially for the implementation of multiple sensors or networks of sensors. The collected samples can be transmitted directly without any additional compression for bandwidth reduction.

The key innovative concept in the invention is that although much of the information is lost in the receive signal due to the low sampling rate of the receiver, the signal can be modeled as a linear combination of time-shifted versions of the transmitted waveforms. Thus, by constructing a redundant dictionary that composes time-shifted versions of the transmit waveform, the SMB technique solves for a sparse solution of the coefficients that represent the significant components contributing to the received signal. Using simulated data as well as real-world data from the ARL UWB radar, it has been demonstrated that the SMB technique successfully models and synthesizes the radar data from real-life scenes using only a handful of coefficients. The SAR image reconstruction using the SMB reconstruction technique on sub-Nyquist sampling data is well matched with the original over-sampling SAR image, while conventional interpolation techniques, when asked to recover the missing information, may fail.

Although the invention is demonstrated with the application of this technique to radar applications, the sampling and reconstruction technique of the present invention also works with other communication systems, especially ones that employ ultra high-frequency modulation schemes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the Spirit thereof, and the embodiments herein include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 14-23 the colors represent a decibel range which ranges from red to blue, red being the strongest signal and blue being the weakest.

The embodiments herein will be better understood from the following detailed description with reference to the drawings, in which:

FIG. 1A is a diagrammatic illustration of an example utilizing the basic concept of the backprojection imaging algorithm.

Figure 1B:
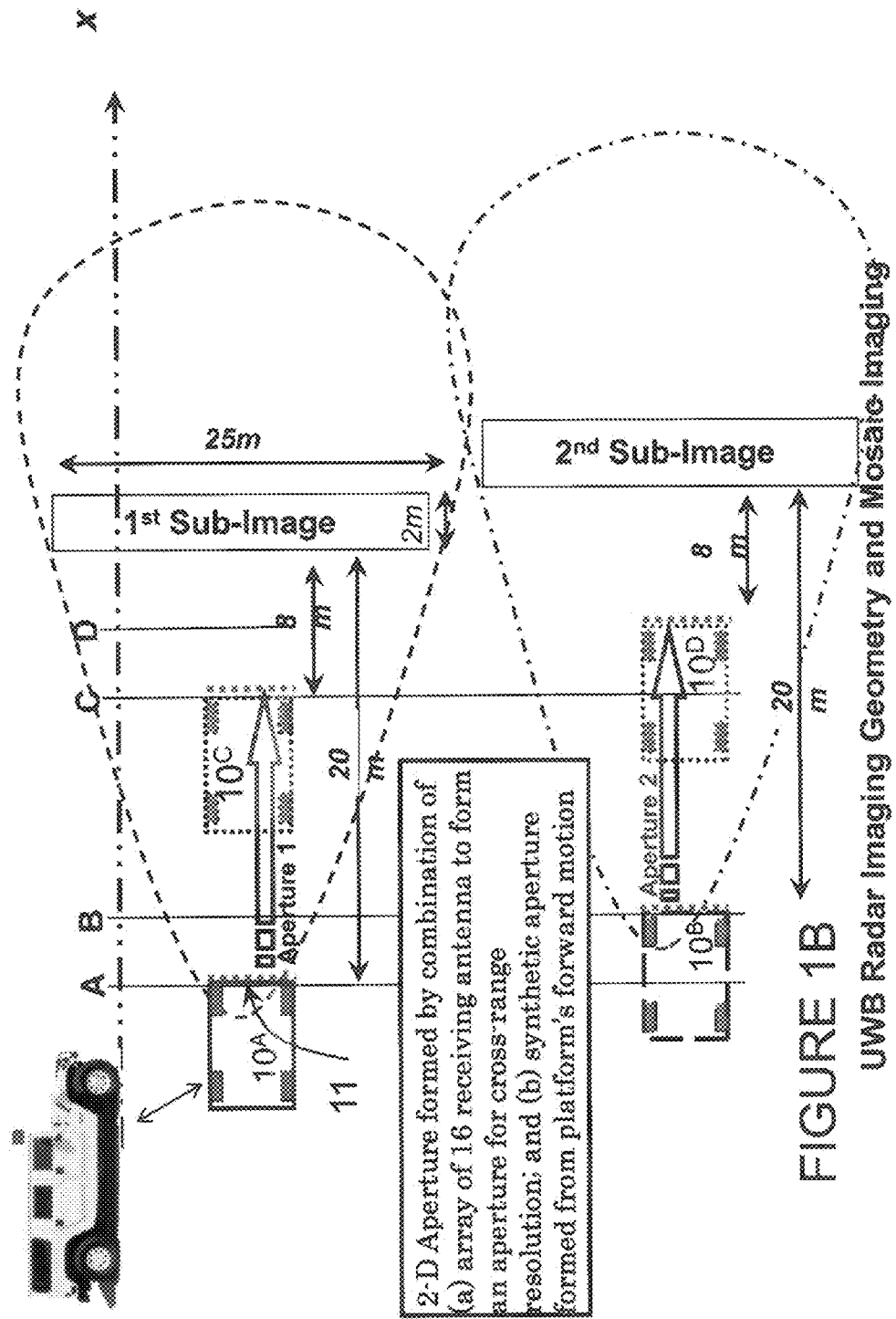
Figure 1C:
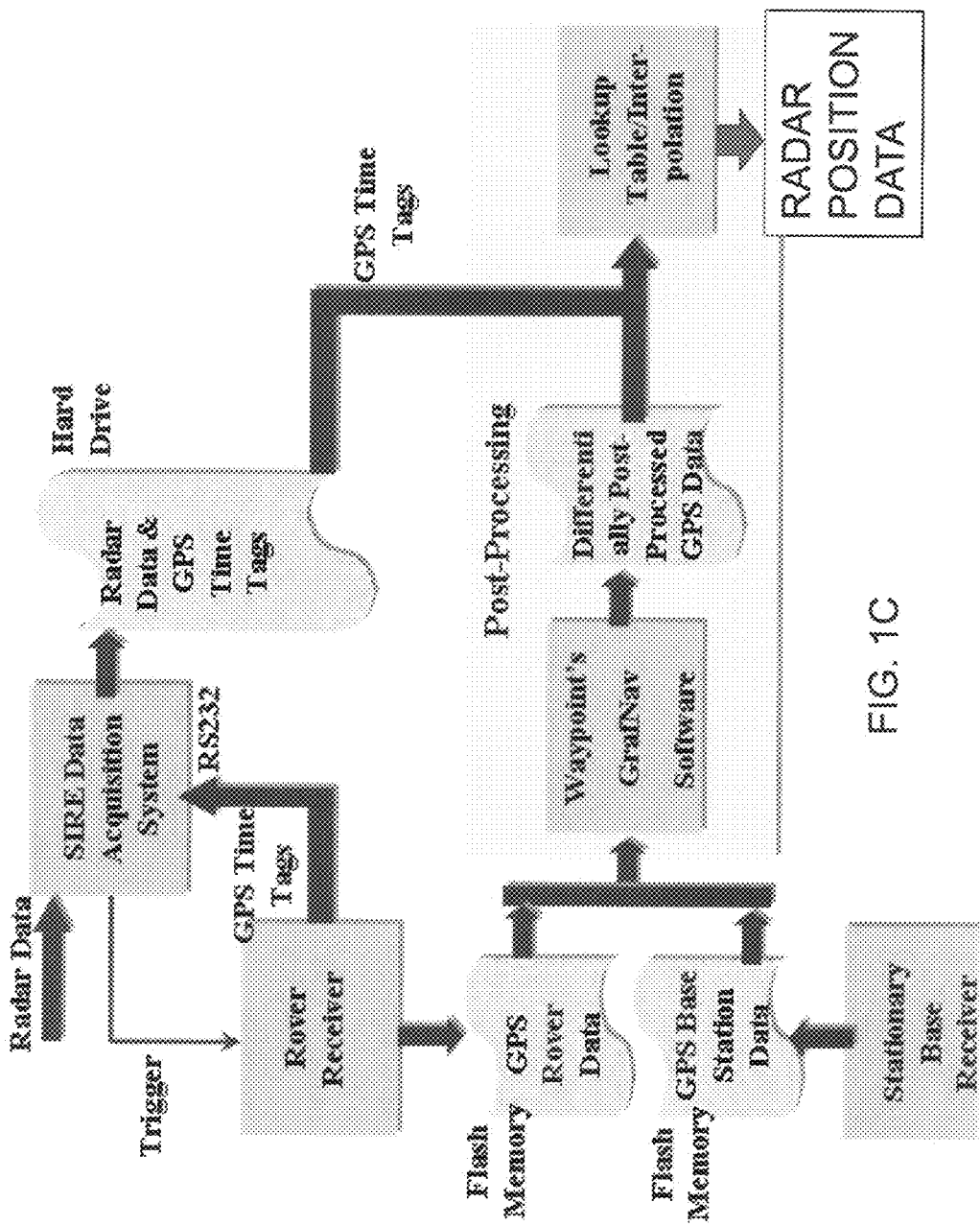
Figure 1D:
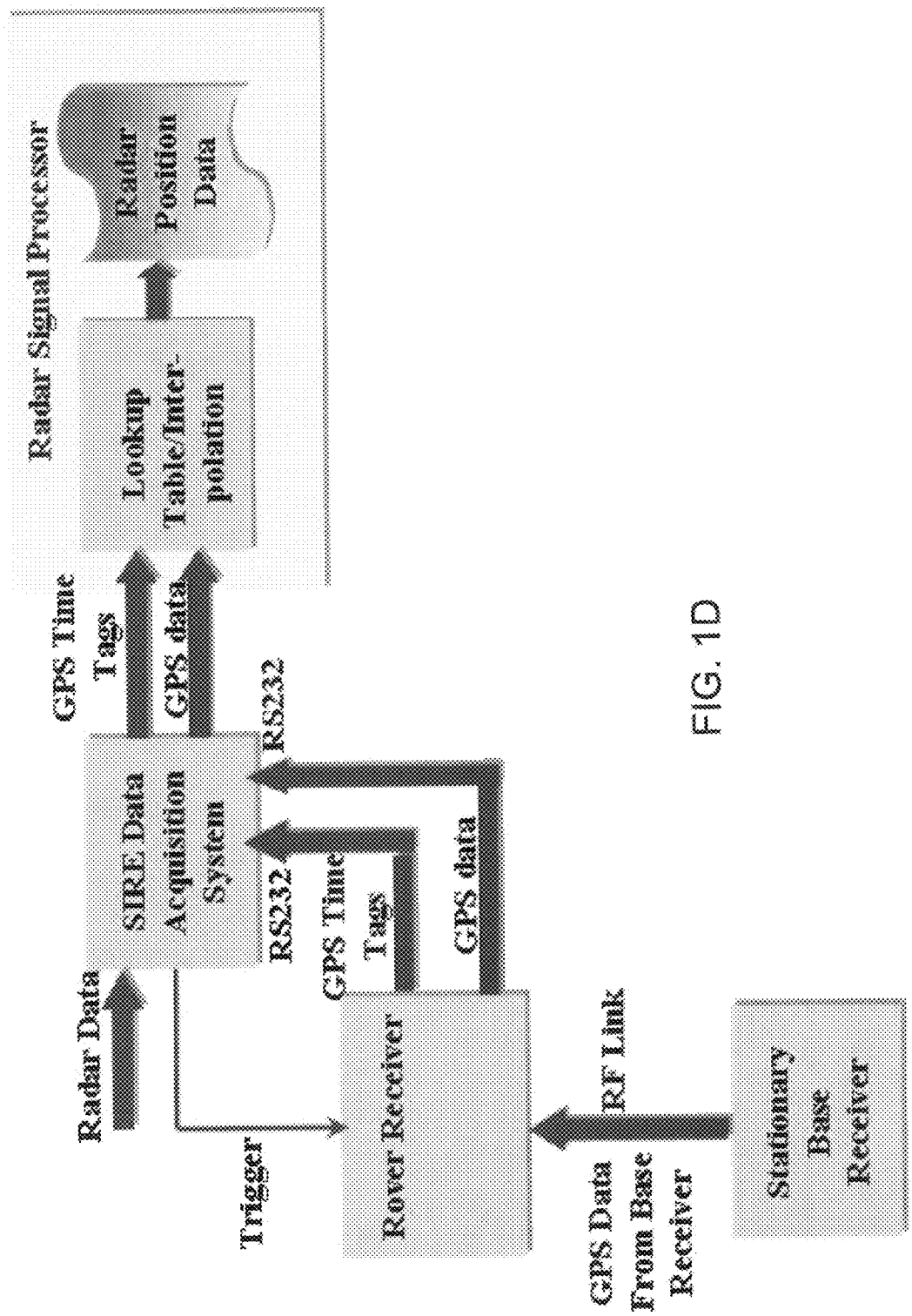
Figure 2:
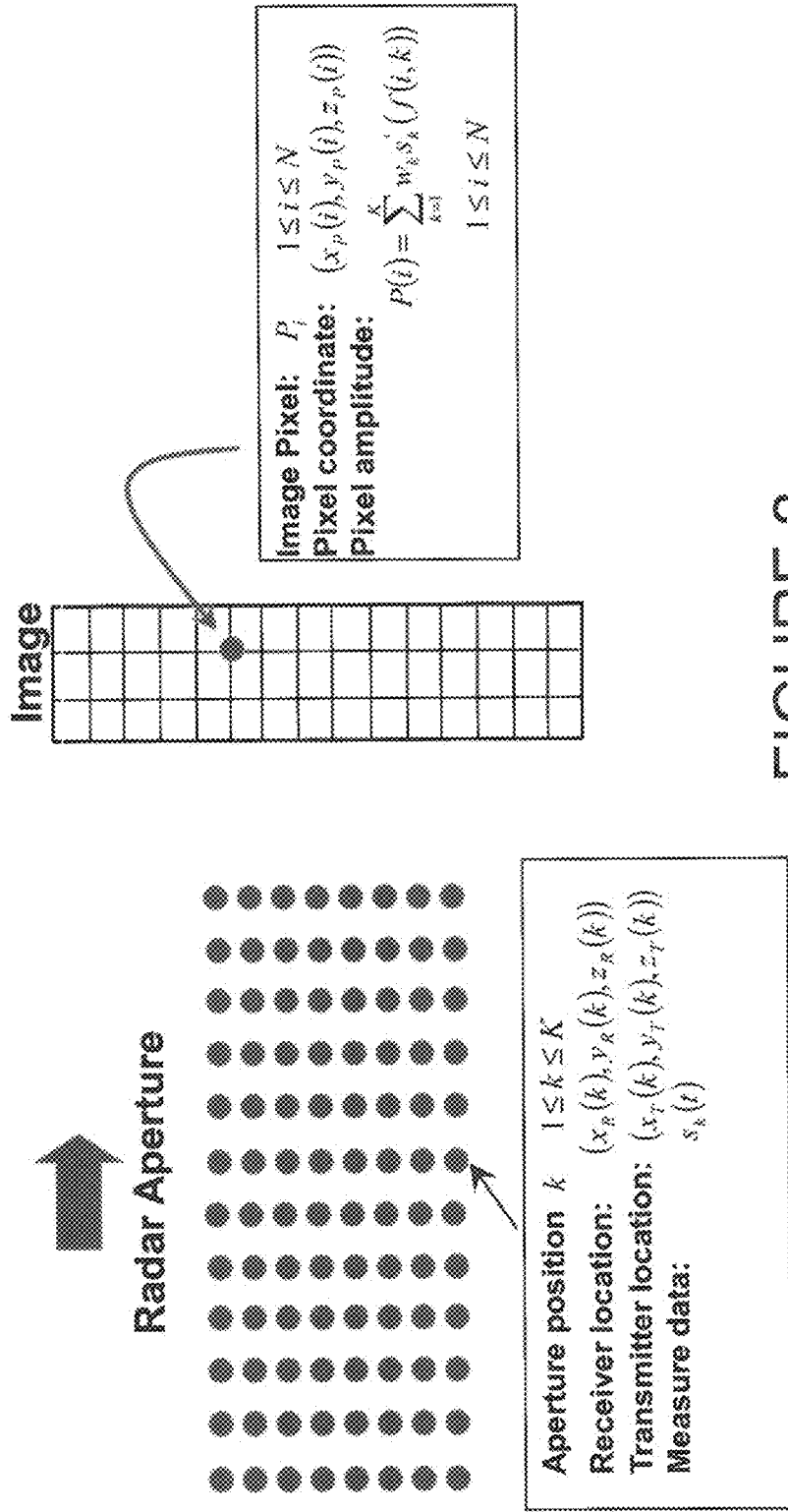

FIG. 1B is a block diagram of the overall processing steps for the ARL radar data in the forward-looking mode;

FIG. 1C is a block diagram of the processing of radar position data including GPS data in the post-processing mode;

FIG. 1D is a block diagram of the processing of radar position data including GPS data in the real-time processing mode;

FIG. 2 is a diagrammatic illustration of Back-projection image formation applied for each sub-image.

Figure 3:
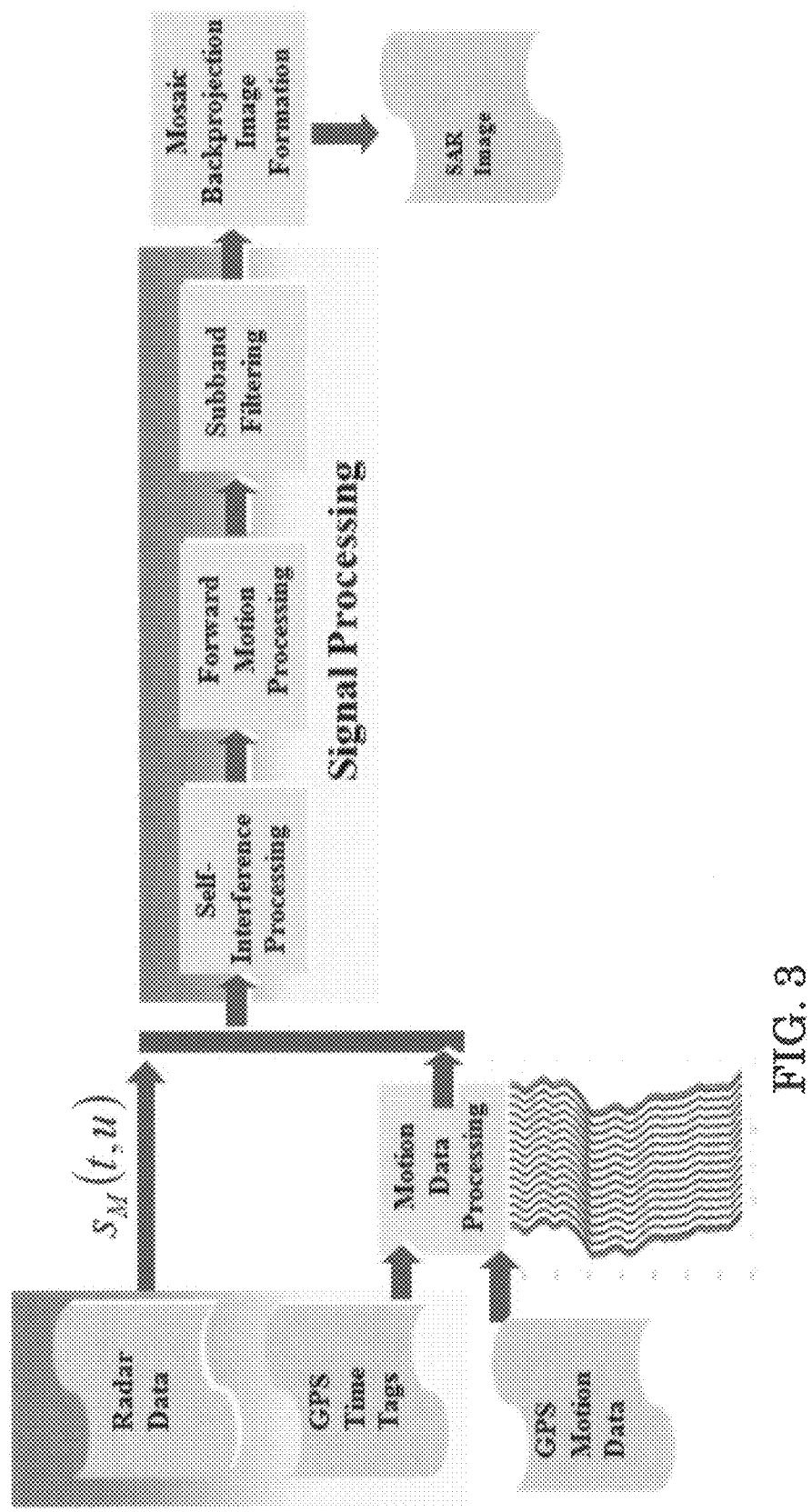

FIG. 3 is a block diagram illustration of a SAR system.

Figure 4:
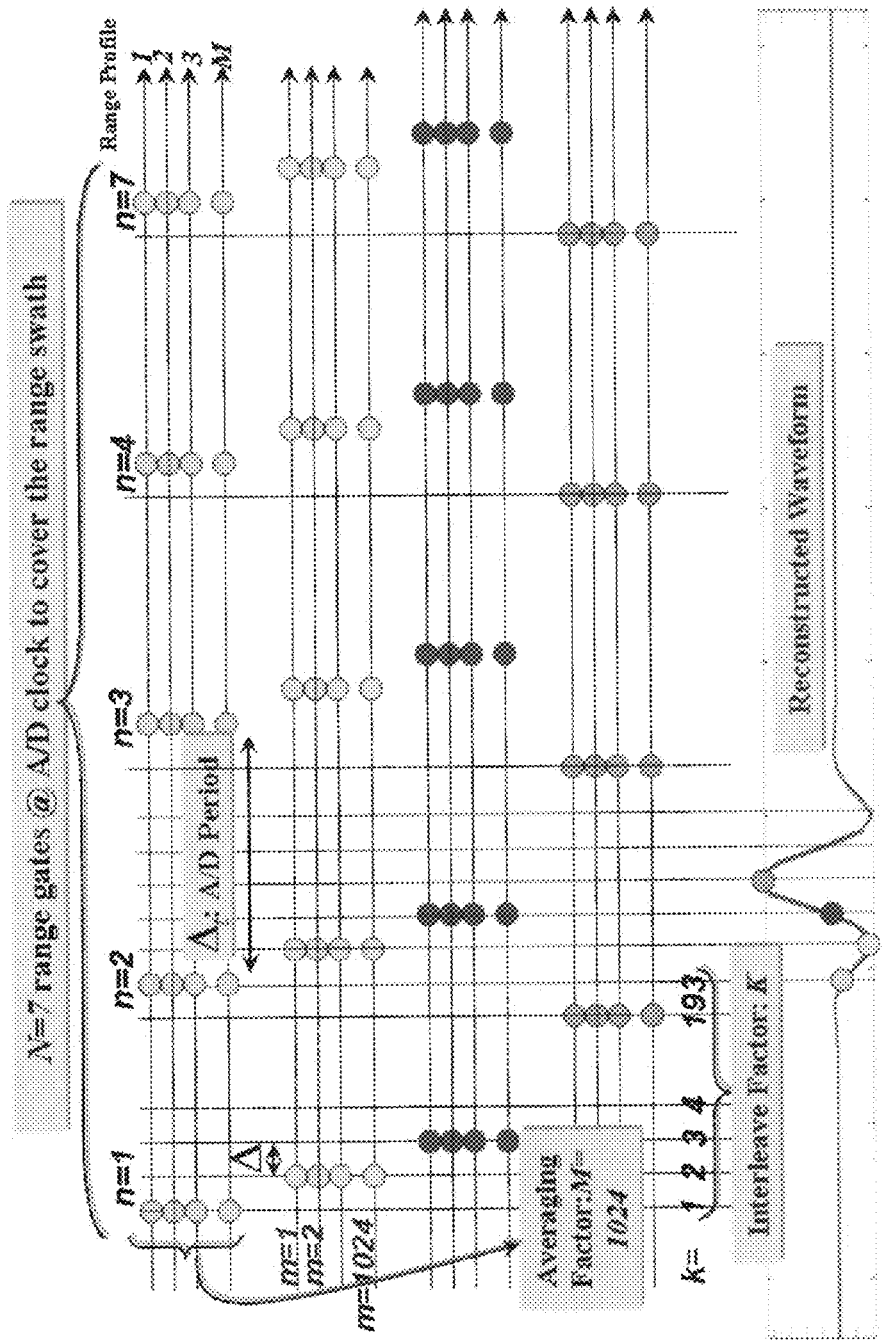

FIG. 4 provides a graphical representation of the SIRE acquisition technique.

Figure 5:
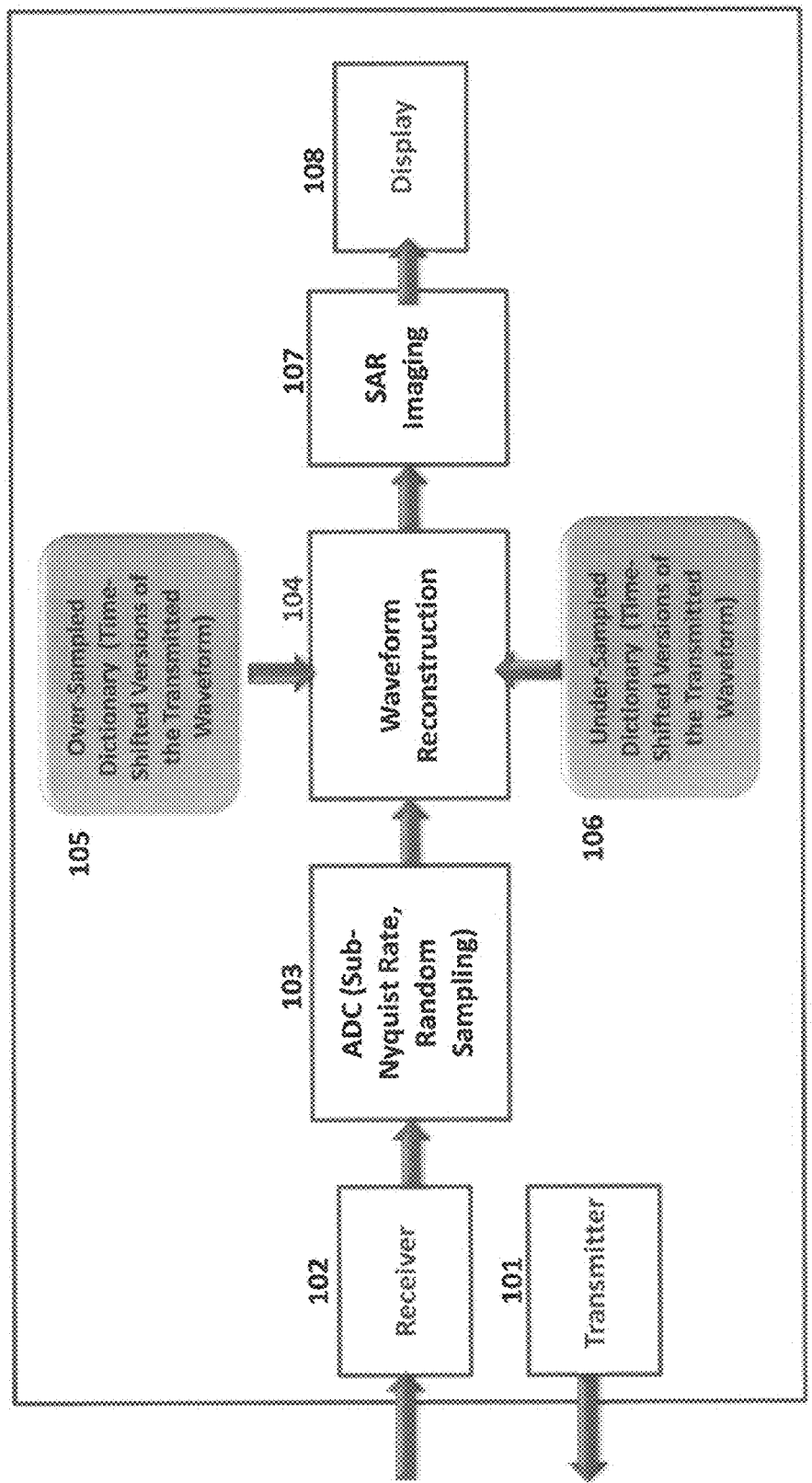

FIG. 5 schematically illustrates an overall system block diagram of a preferred embodiment SAR system in conjunction with the SMB sub-Nyquist sampling and reconstruction technique.

Figure 6:
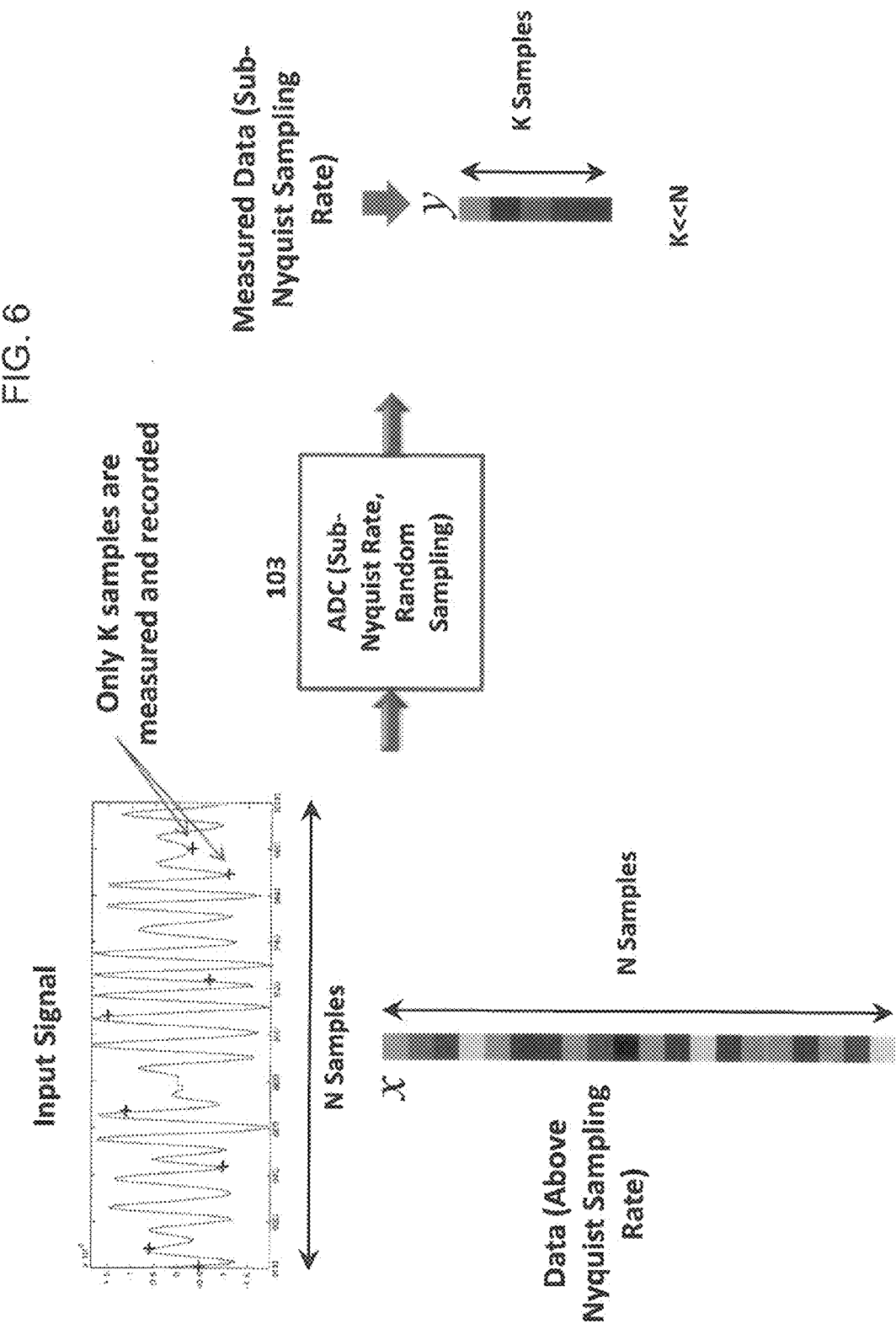

FIG. 6 diagrammatically illustrates the sampling process.

Figure 7:
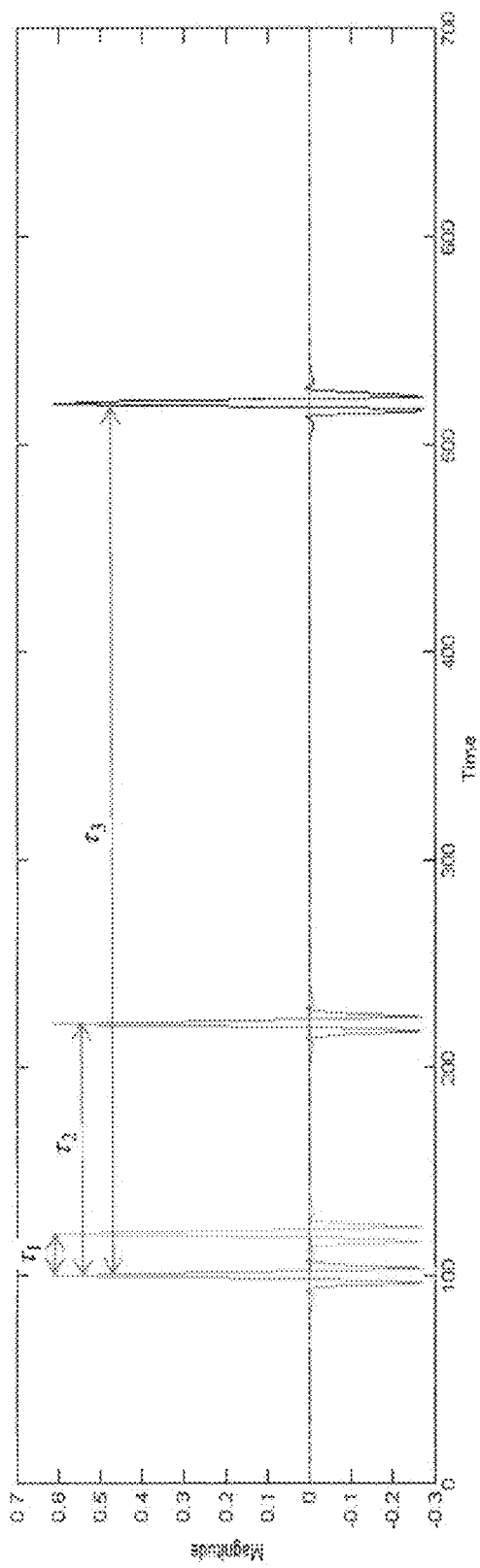

FIG. 7 depicts a single received SAR signal s(t) if the imaging scene of interest contains only one single point source and its various time-delayed versions. The digitized versions of these signals sampled at Nyquist rate make up our model-based time-delayed dictionary or frame.

Figure 8:
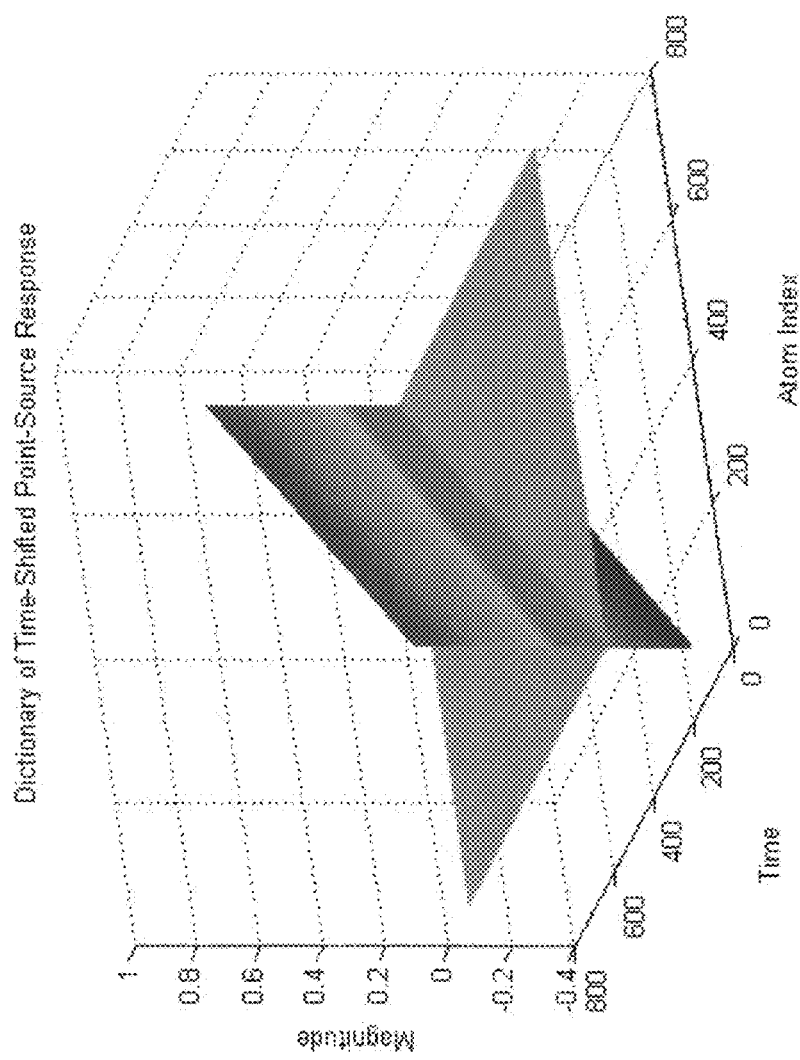

FIG. 8 visualizes the entire redundant dictionary or frame when all atoms are plots in the same coordinate system.

Figure 9:
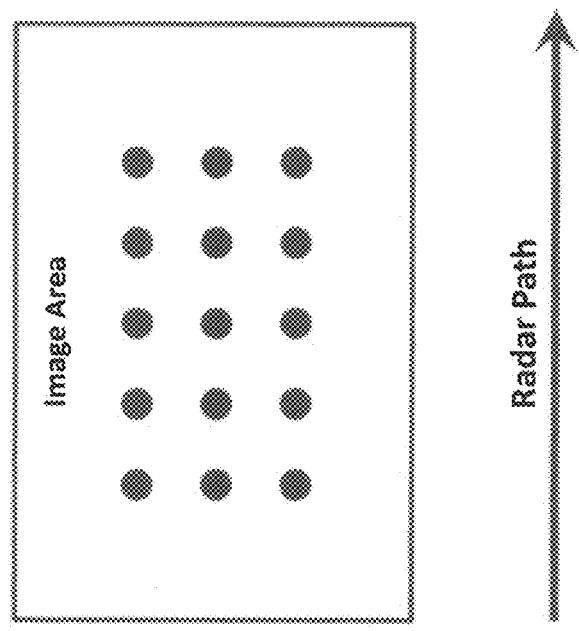

FIG. 9 schematically illustrates Imaging Geometry for radar configured in side-looking mode.

Figure 10:
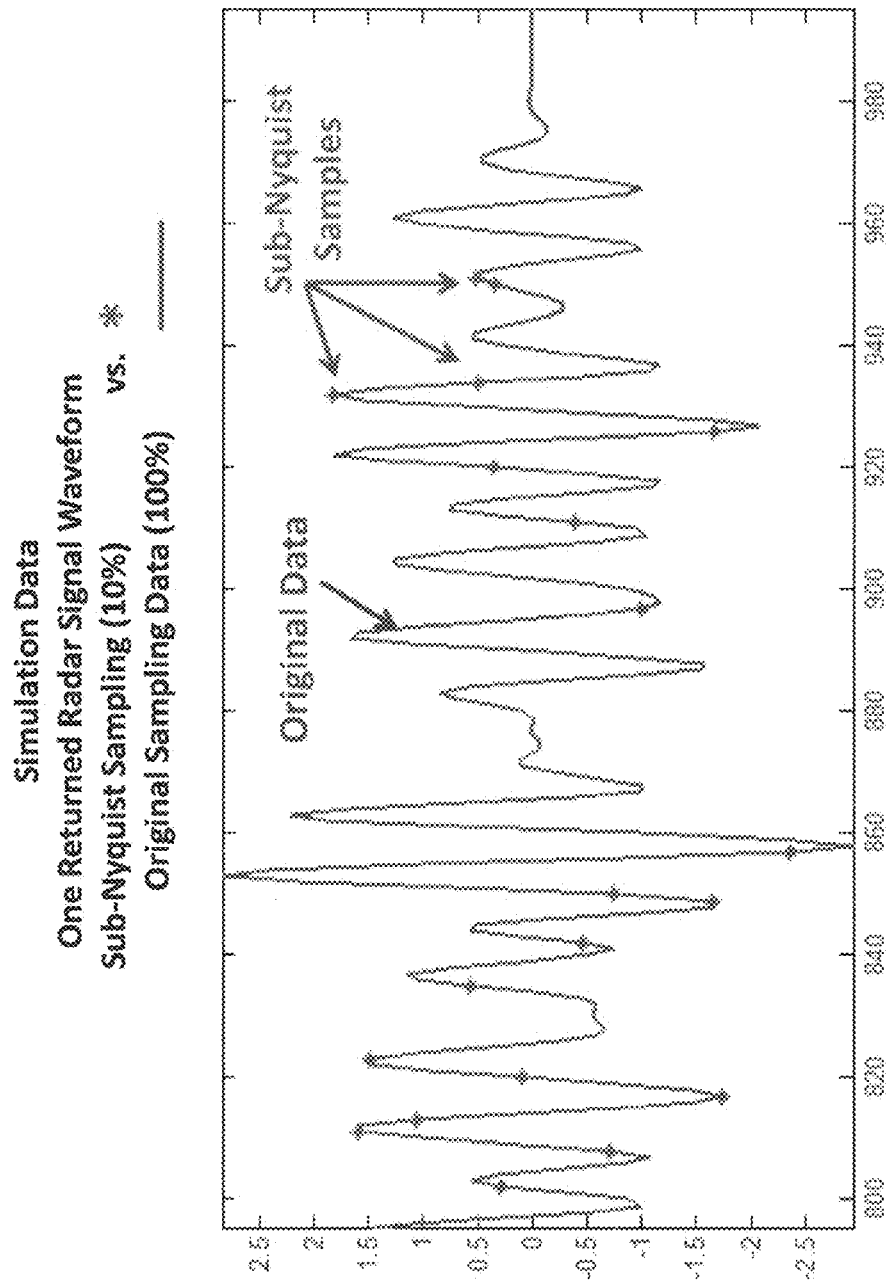

FIG. 10 illustrates one returned radar waveform with sub-Nyquist sampling (10%) shown using diamonds on the original waveform.

Figure 11:
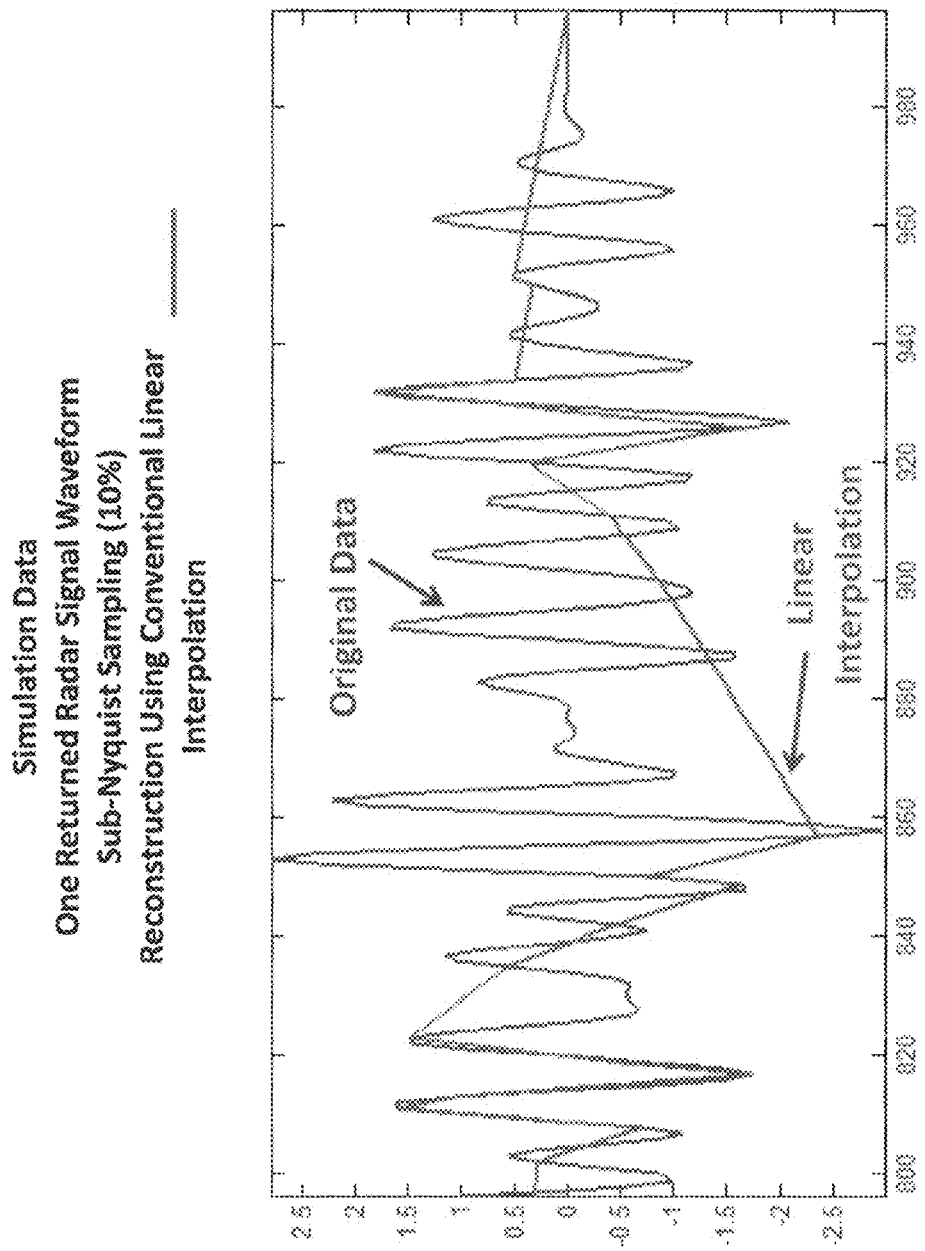

FIG. 11 illustrates the reconstructed waveforms (red curves) using the conventional linear interpolation.

Figure 12:
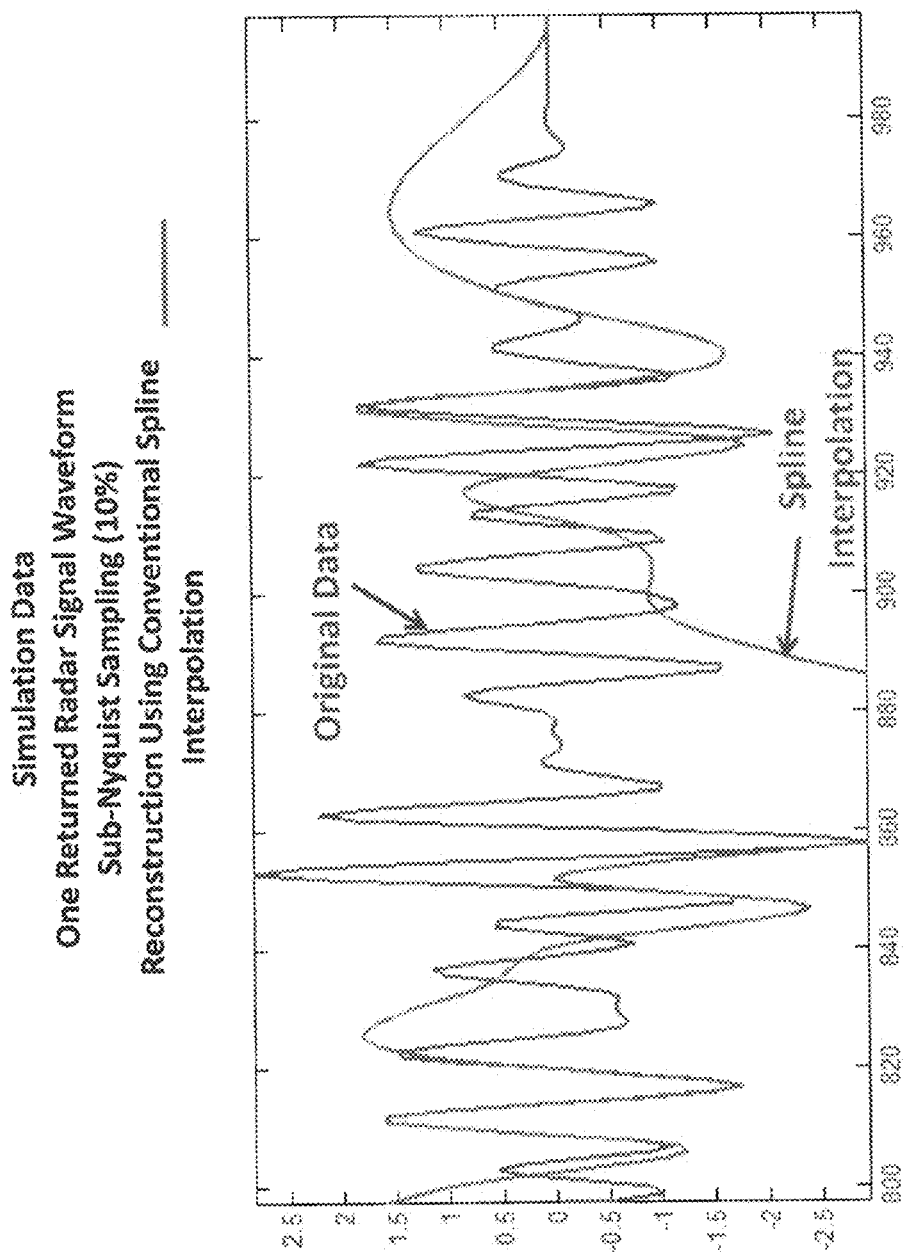

FIG. 12 illustrates the reconstructed waveforms (red curves) using spline interpolation.

Figure 13:
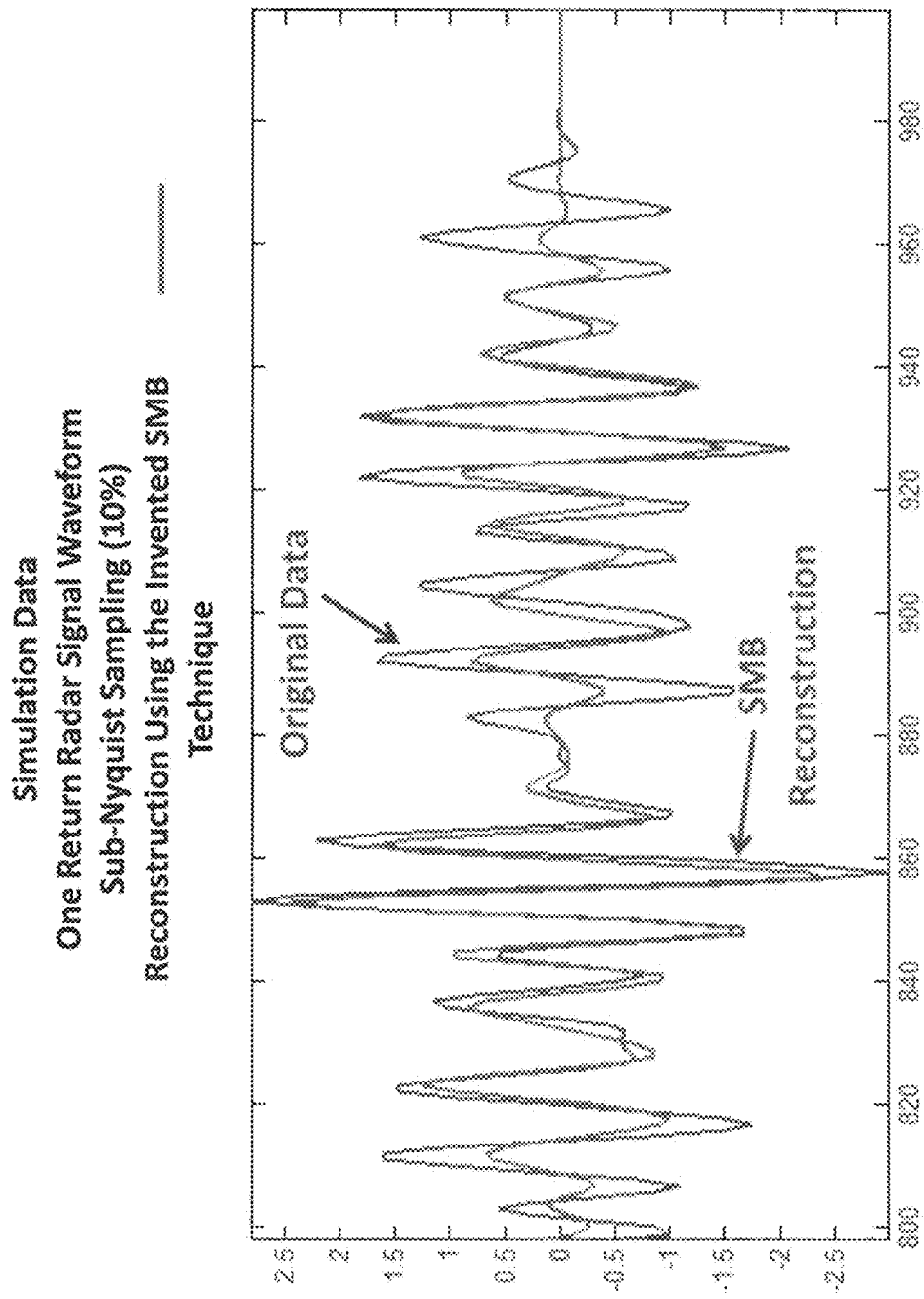

FIG. 13 illustrates simulation data representing one return radar signal waveform with Sub-Nyquist Sampling (10%) reconstruction using the preferred embodiment SMB Technique.

Figure 14:
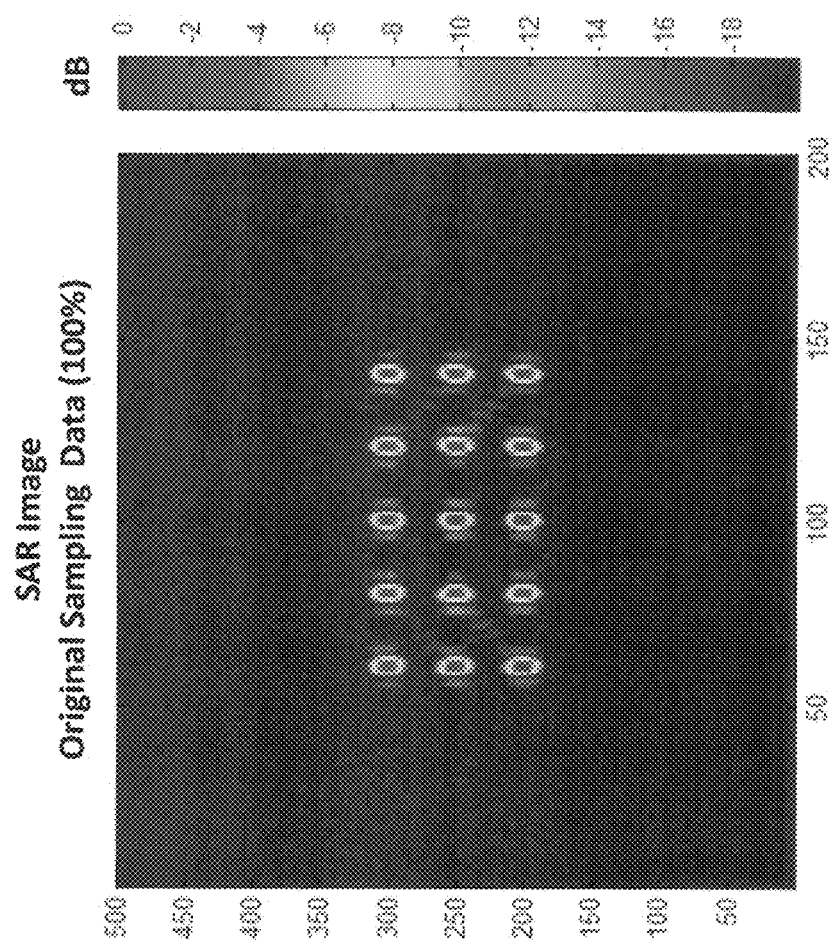

FIG. 14 illustrates the SAR image for this simulation scenario of FIG. 9.

Figure 15:
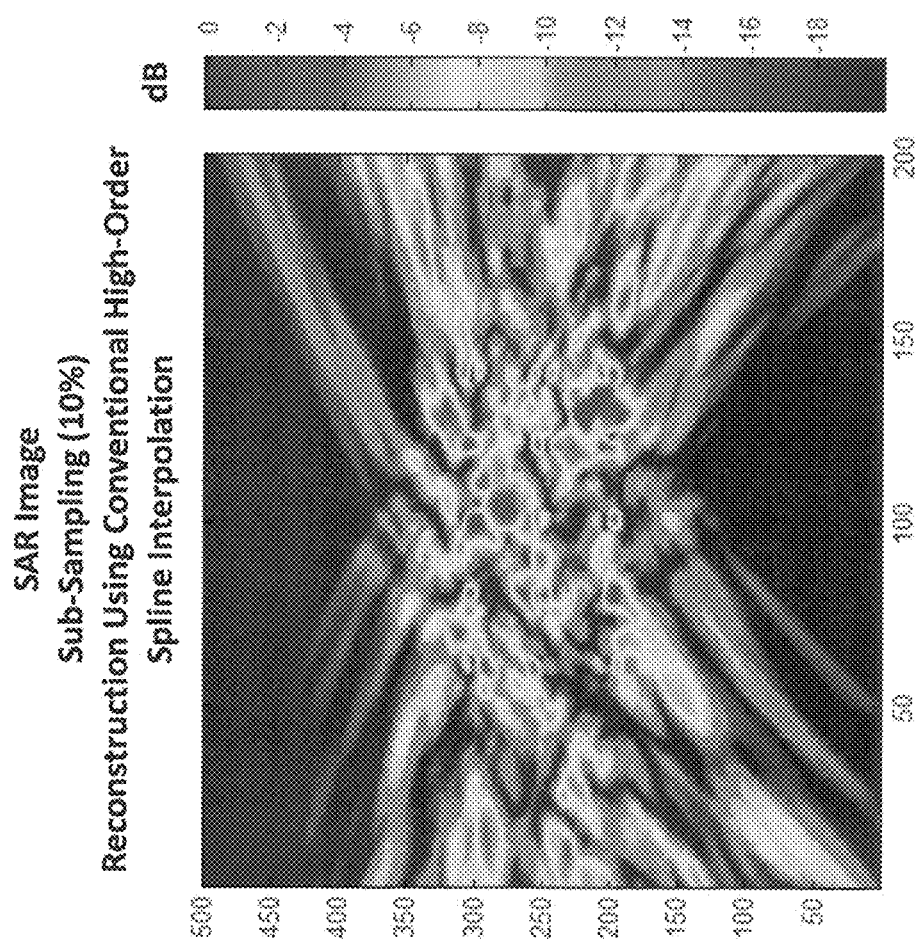

FIG. 15 illustrates a SAR image formed using the reconstructed data from spline interpolation.

Figure 16:
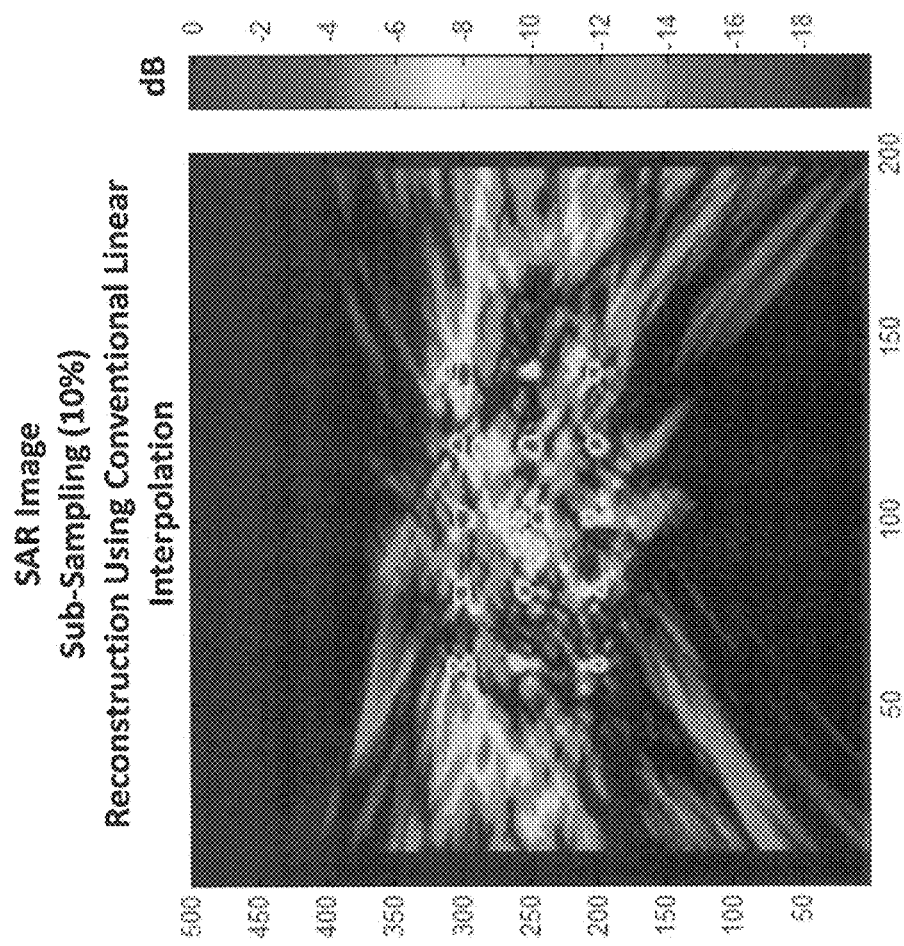

FIG. 16 illustrates a SAR image formed using the reconstructed data from linear interpolation.

Figure 17:
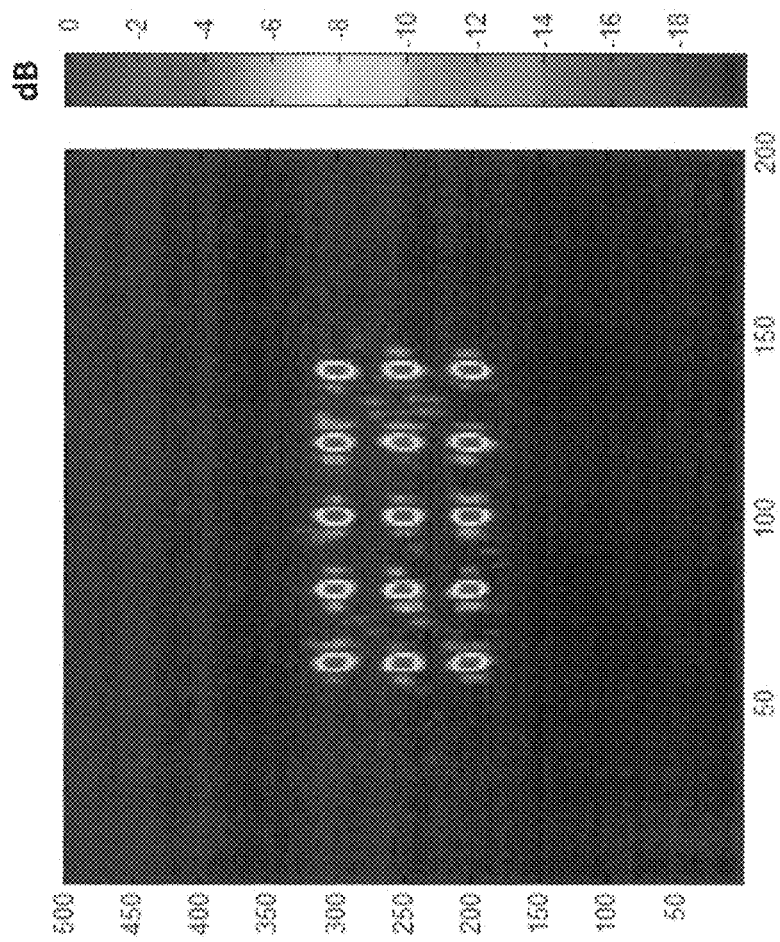

FIG. 17 illustrates a SAR image formed using the reconstructed data from the preferred embodiment SMB reconstruction technique.

Figure 18:
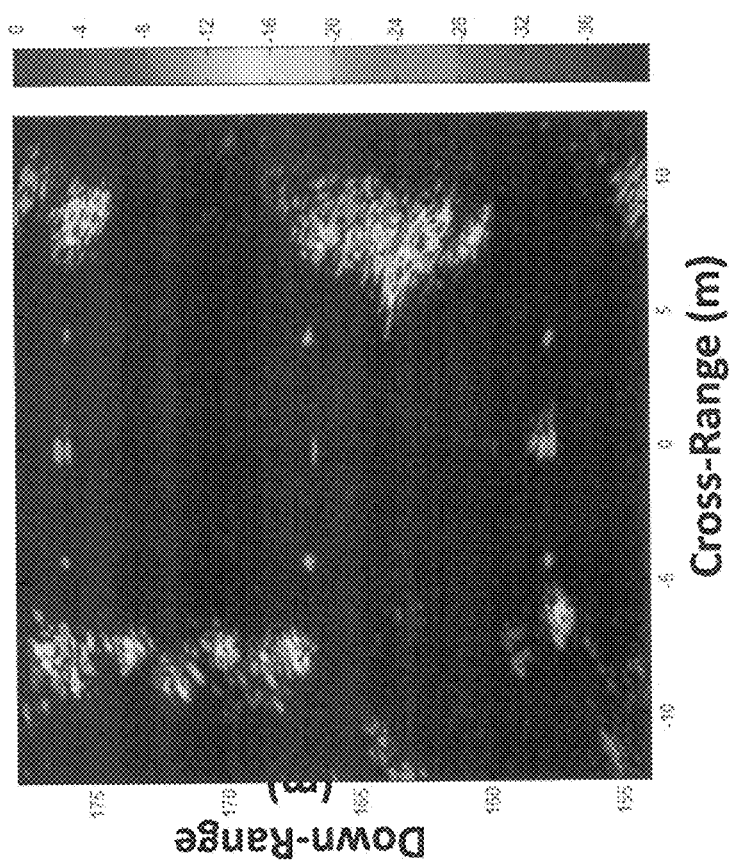

FIG. 18 illustrates a SAR image formed using data from ARL UWB SAR radar using original sampling (100%).

Figure 19:
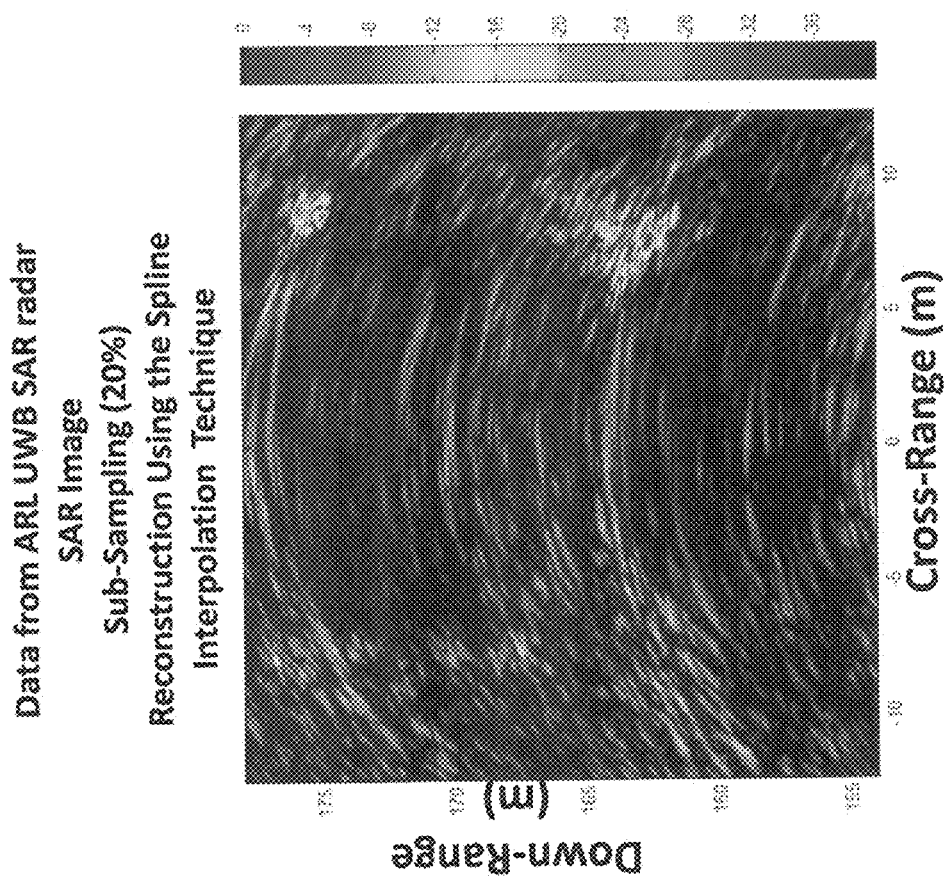

FIG. 19 illustrates a SAR image formed from data from ARL UWB SAR radar using twenty percent sampling, reconstruction using the spline interpolation technique.

Figure 20:
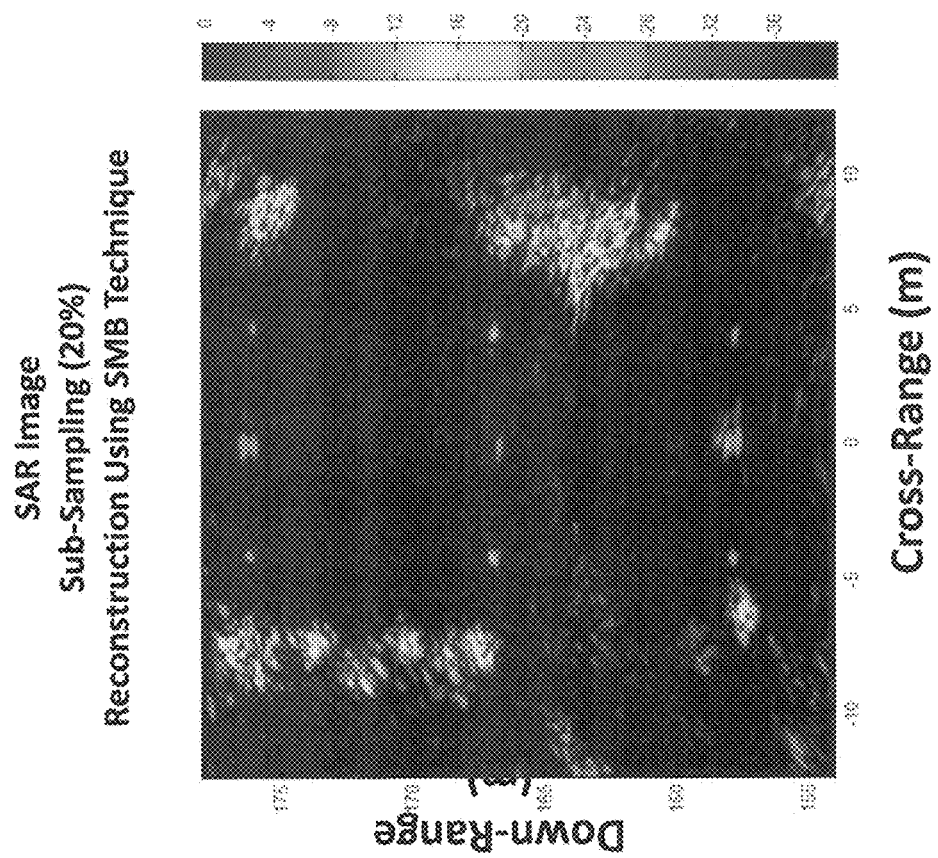

FIG. 20 illustrates a SAR image formed from data from ARL UWB SAR radar using twenty percent sampling, reconstruction using the preferred embodiment SMB technique.

Figure 21:
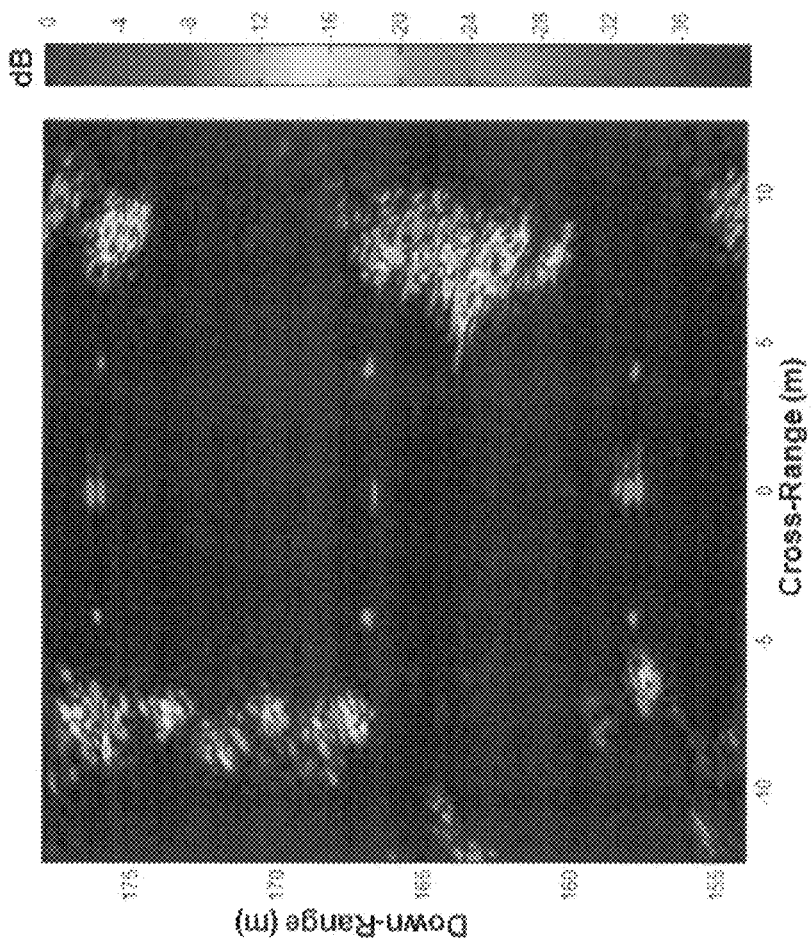

FIG. 21 shows a SAR image formed using data from the ARL UWB radar in forward-looking mode using 100% of over-sampling data (7.720 Giga-samples/sec).

FIG. 22A illustrates a SAR image formed using the standard compressed sensing framework with data sampled at the original sampling rate, and projected using Guassian sensing matrix. The reconstruction is based on the number of measured (projected) samples, which is 20% (1.544 Giga samples/sec) of the original data samples. Note that over-sampled data are still needed because of the global random projection data-collection scheme.

FIG. 22B illustrates a SAR image formed using the linear interpolation technique to reconstruct the data. Data sampled at the 20% (1.544 Giga samples/sec) of the original sampling rate (7.72 Giga samples/sec)

FIG. 22C illustrates a SAR image formed using the preferred embodiment SMB technique to reconstruct the data.

Data sampled at the 20% (1.544 Giga samples/sec) of the original sampling rate (7.72 Giga samples/sec).

FIG. 23A illustrates a SAR image formed using the standard compressed sensing framework. The reconstruction is based on the number of measured (projected) samples, which is 10% of the original data samples. Note that over-sampled data are still needed because of the global random projection data-collection scheme FIG. 23B illustrates a SAR image formed SAR image using the linear interpolation technique to reconstruct the data. Data are sampled at the 10% of the original sampling rate.

FIG. 23C illustrates a SAR image formed using the proposed SMB technique to reconstruct the data. Data are sampled at the 10% of the original sampling rate.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. Embodiments of the present invention should not be construed as limited to the particular shapes of regions illustrated herein but are to include deviations in shapes that result, for example, from manufacturing. The regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

In general, the radar systems described herein may be airborne or ground-based and include global positioning system (GPS) sub-system (see FIG. 3). Both the radar device and the transmitting/receiving antenna array 11 are mounted on vehicle 10. The GAS sub-system of the radar device records the radar position and the radar signals from the receiving antennas at each data acquisition cycle logged by the moving platform. Timing control circuitry is responsible for coordinating the transmitted and received sequence that the radar operates. Further details of the GPS system are disclosed in U.S. patent application Ser. No. 12/942,362 (ARL 07-32) entitled "MULTIDIRECTIONAL TARGET DETECTING SYSTEM AND METHOD," which is hereby incorporated by reference.

Angular resolution is determined by the size of the receiving antenna array, and the synthetic aperture generated by the motion of the vehicle. At a given range, the ability to resolve objects or targets in the cross-range direction is known as the cross-range resolution. Similarly, the ability to resolve objects or targets in the down-range direction is known as down-range resolution. The down-range resolution of the SAR system according to the present invention is generally provided by the bandwidth of the transmitted pulse from transmitting elements, having a wide range of frequency. The cross-range resolution is provided by both the array of receiving elements and the radar generated by the moving platform. Additionally, the radar antenna array may include two symmetrical sub-systems: a first (or forward-looking) group of antenna elements and/or second (or backward-looking) group of antenna elements. Each group may include two transmitting elements (e.g., a transmitter and transmitting antenna) and eight receiving elements (e.g., a receiver and receiving antenna). Each receiving antenna feeds its own receiver, and functions essentially as a digitizing system. To that end, each receiving antenna feeds an analog signal or data to each receiver which in turn converts or processes the analog data or signal in digitized form. The digitized data generated from each receiver of each receiving element is combined and sent to processor, which then performs data processing tasks on the digitized signal (e.g., removal of interference from the digitized backprojection signal, motion compensation, filtering, and forming SAR imagery) using known image processing techniques, as outlined in "Signal and Image Processing Algorithms for the Army Research Lab Ultra-Wideband Synchronous Impulse Reconstruction (UWB SIRE) Radar," Army Research Laboratory Technical Report ARL-TR-4784 (2009), by Lam Nguyen, which is incorporated herein by reference.

FIG. 5 shows the overall system block diagram of a preferred embodiment of the present invention. The SAR system shown works in conjunction with the SMB sub-Nyquist sampling and reconstruction technique. The invention is not limited to this particular configuration. In general, any communication system that employs wide bandwidth (often modulated) signals should work similarly. In FIG. 5, the SAR transmitter (101) transmits radar signals to illuminate an area of interest. The receiver (102) receives the returned radar signal and the ADC subsystem (103) directly digitizes the wide bandwidth return signal at a much slower rate (sub-Nyquist) than the minimum required sampling rate (Nyquist). The sub-Nyquist samples are then sent to the waveform reconstruction processor (104) for signal recovery. The waveform reconstruction processor (104) uses two dictionaries (105) and (106) that include many time-shifted versions of the transmitted waveform. In the upper dictionary (105), the time shifted versions of the transmit waveform are over-sampled (above the Nyquist rate). In the lower dictionary (106), the time shifted versions of the transmitted waveform are under-sampled (below the Nyquist rate). After the received waveform is reconstructed using the waveform reconstruction processor (104), the digitized data are sent to the SAR imaging processor (107) to form the final SAR imagery. The resulting SAR image is then visualized by the display (108).

Compressed Sampling Theory

Part of the Compressed Sampling appeal comes from the implication that a sparse signal can be sampled at a rate much lower than the traditional Nyquist sampling rate. Compressed sensing (CS) is a novel sampling theory, which is based on exploiting sparsity or compressibility when acquiring signals of general interest. Compressed sensing designs non-adaptive sampling techniques that condense the information in a compressible signal into a small amount of data. From the CS framework, certain signals or images can be reconstructed from much fewer samples than the traditional sampling methods, provided that the signals are sparse in certain domains. Although the CS framework offers data compression, it still does not address the drawback described in the Background section; that is, the data acquisition must be operated in equivalent time since many global measurements (obtained from global random projections) are required as depicted by the sensing matrix $\Phi$ in the CS framework. Note that in the following, bold face characters denote vectors while bold-faced uppercase characters denote matrices Sampling Stage FIG. 6 diagrammatically illustrates the sampling process. The analog-to-digital converter (ADC) subsystem is operated at a much slower rate than the required minimum sampling rate (Nyquist). More specifically, let x be a signal of length N, it is said to be K-sparse if x only has K<<N significant (non-zero) entries, i.e., $\|x_0\|$=K. The signal is said to be K-sparse if x can be well approximated using K<<N coefficients under some linear transform, e.g. the Discrete Fourier Transform (DFT), the Discrete Cosine Transform (DCT) Discrete Wavelet Transform (DWT). Such a signal can be acquired through a series of incoherent linear projections. Note that the ADC digitizes only K samples from the returned signal, where K<<N, and N is the number of samples required to satisfy the Nyquist sampling rate. In the plot of FIG. 6, the smooth curve shows the wide-band input signal whereas the +'s on the smooth curve are the K samples digitized by the ADC.

Let $\Phi$ be the "sampling" matrix of size M×N. The digitized waveform is obtained from $$y = \Phi x \qquad \text{(Equation 3A).}$$

where y is a vector with M entries containing the measurements (discrete samples of the signal x) and $\Phi$ represents an M×N incoherent sensing matrix, usually constructed from random Gaussian matrices.

For the conventional sampling process, the analog-to-digital converter (ADC) is clocked at above Nyquist rate. In this case $\Phi$ is an identity matrix I (where the value of any element along the diagonal line of the matrix is one and the value of any other element of the matrix is zero). This results in the digitized signal y=x with N samples. However, in the preferred embodiment sub-Nyquist sampling process, only M samples (M<<N) are digitized from the input signal. Thus rows of the sampling matrix $\Phi$ in this case form a subset of the rows of the identity matrix I. The size of $\Phi$ is M×N, i.e., only M rows from the identity matrix I are selected. The selection of M rows from N rows of the identity matrix could be from randomized selection or from any uniformly-spaced interval. This results in M digitized signal samples stored in the vector y (these samples hence should lie directly on the original analog signal curve x(t)). Note that the generation of the sampling matrix $\Phi$ could be initialized once and be used among many records, or it could be changed from one record to the next. The important point is that the same sensing matrix $\Phi$ should be used in both stages: signal sampling and signal reconstruction.

The plot from FIG. 10 shows the original received waveform (smooth curve) and the sub-Nyquist samples (diamond sample dots) at the output of the ADC subsystem (103). Only 10% of the original samples from the smooth waveform are measured. It is obvious that much of the original information from the received waveform is lost. Without any additional information, the best conventional approach to reconstruct the signal is to use some types of interpolation techniques. FIGS. 11 and 12 show the reconstructed waveforms (red curves) using the conventional linear and spline interpolation techniques, respectively. It is obvious from FIGS. 11 and 12 that these conventional techniques fail to reconstruct the original waveform.

Compressed Sensing Framework-Reconstruction

While sampling process is simply a random linear projection, the reconstruction process is highly non-linear—it attempts to find the sparsest signal from the received measurements. More precisely, the reconstruction algorithm is to solve the following sparsity-driven inverse problem $$\alpha^* = \min|\alpha|_0 \, s.t. \, y = \Phi\Psi\alpha \quad (4A)$$

and the original signal can be recovered as $x^* = \Psi\alpha^*$. Under some mild assumptions, the compressed sensing theory asserts that x can be faithfully recovered from M=O (K log N) measurements with very high success probability by solving the following optimization problem.

$$\min\|x\|_1 \text{ subject to } y = \Phi x \quad \text{Equation (1A)}$$

The optimization problem above is however an NP-hard problem and is computationally very expensive to solve. The Compressed Sensing (CS) theory addresses that under some mild conditions on sensing matrix $\Phi$, the $l_0$-norm minimization problem ($L_0$-norm is simply its number of significant (non-zero) elements) can be efficiently solved by recasting it as the following $l_1$-norm convex optimization.

$$\alpha^* = \min|\alpha|_1 \text{ such that } y = \Phi\Psi\alpha. \quad (4A)$$

and the original signal can be recovered as $x^* = \Psi\alpha^*$. The CS framework asserts that x can be faithfully recovered from only M=O (K log N) measurements y, suggesting a potential of significant cost reduction in data acquisition. The optimization problem above is however an NP-hard problem and is computationally very expensive to solve. The CS theory addresses that under some mild conditions on sensing matrix $\Phi$, the $l_0$-norm minimization problem can be efficiently solved by recasting it as the following $l_1$-norm convex optimization $$\alpha^* = \min|\alpha|_1 \, s.t. \, y = \Phi\Psi\alpha. \quad (5A)$$

Again, under some mild conditions of the sensing matrix $\Phi$, the reconstructed signal $x^*$ via the equation $y = \Phi x$, which can be roughly regarded as the sparsest (or most compressible) solution from many candidate solutions of the under-determined equation in Equation 1A. In order to faithfully recover the input signal from a few compressed measurements, the sensing matrix $\Phi$ needs to be incoherent with the sparsifying matrix $\Psi$. In other words, the product matrix $A = \Phi\Psi$ is required to have good Restricted Isometry Property (RIP), i.e. for all vectors $\alpha_T$ and for all subset of K=|T| columns of the matrix A (denoted as $A_T$), yields:

$$(1-\delta)\|\alpha_T\|^2 \le \|A_T\alpha_T\|^2 \le (1+\delta)\|\alpha_T\|^2$$

where $\delta$ is some constant $0 < \delta < 1$.

The problem consists of designing (a) a stable measurement matrix $\Phi$ such that the salient information in any K sparse or compressible signal is not damaged by the dimensionality reduction and (b) a robust reconstruction algorithm to recover the sparse signal x from the measurements y.

From a sensing point-of-view, a direct straightforward implementation of the series of incoherent linear projections in ($y = \Phi x$ (3A)) does not immediately lead to sub-Nyquist sampling since a very fast analog-digital converter (ADC) is still needed to capture the digital samples in the vector x in the first place. Furthermore, since the randomly generated dense linear operator $\Phi$ has no structure, there does not exist fast algorithms and efficient implementations for it. Sparser and more deterministic sensing operators with fast implementations such as structurally random matrices described in Thong T. Do, Trac D. Tran and Lu Gan, "Fast compressive sampling using structurally random matrices", Proc. of ICASSP 2008, Las Vegas, April, (2008), hereby incorporated by reference, can retain the high performances of random matrices while yielding much lower computational cost. Nevertheless, they still depend on highly accurate digital samples at very fine resolution from the original signal of interest. To realize the true compressed sensing advantage, one has to collect SAR data via analog components with a slower sampling clock. Such technique requires significant modifications to the current ARL UWB SAR system's hardware. It is more desirable to minimize the level of software/hardware upgrades while applying the Compressed. Sensing (CS) concepts to improve reconstruction image quality while achieving sub-Nyquist sampling rate.

From a recovery point-of-view, in the vector space $H = C^N$ of N-dimensional signals, vector x can be represented as $x = \Psi\alpha$, where $\Psi$ is called the sparsifying matrix which in other words, the representation through $\Psi$ can be (and in many cases, should be) redundant. The sparsifying matrix is said to be complete if its columns span the entire N-dimensional space. The signal x is said to be strictly K-sparse when there are only K non-zero components in $\alpha$. When the sorted magnitudes of ($\alpha_i$) decay very quickly and x can be well approximated with only K components, then x is said to be K-compressible. Needless to say, the effectiveness of the recovery algorithm of a class of signal x heavily depends on the sparsest representation of the signal class.

In standard compressed sensing, fixed linear transform bases such as the DCT, FFT and the discrete wavelet transform (DWT) or a combination of all three are often employed to obtain sparsity. In the UWB SAR system, the transmitted pulse is a monocycle impulse with an approximated bandwidth range of 300-3000 MHz. Current collected raw data captured in the 8 receivers do not exhibit any common sparse pattern. In other words, a quick spectrum analysis reveals that our raw data is not time-Sparse or frequency sparse or even wavelet sparse. Hence, a naïve direct application of Compressed Sensing (CS) via random projection with Fourier, cosine, or wavelet bases yields disappointing results.

Over-Complete Dictionary or Frame as Sparsifying Matrix

Signals might not always have the sparsest representation in a conventional signal-independent basis found in transform coding. In the case of compressed sensing, since one does not have to communicate the sparsifying transform from the encoder to the decoder, an over-complete dictionary of previously observed signals or other signal-dependent atoms can be a powerful choice. Here, the dictionary is a collection of $J \ge N$ vectors $\phi_k$, $1 \le k \le J$. Alternatively, a dictionary can be seen as a fat N×J matrix $\Psi$. For a given signal $y \in C^N$, the sparse representation problem consists of finding a representation $x = \Psi\alpha$ where $\alpha \in C^J$ is a sparse vector, i.e. with fewest significant large coefficients and/or most of its coefficients having small/negligible magnitudes.

In a preferred embodiment approach, the dictionary is constructed from time shifted versions of the transmitted probing signal s(t). Define (i, j) with $1 \le i \le I$, $1 \le j \le J$ as the pixel location of a reflective target in the recovery area. The received signal x(t) is simply the summation of reflections of all targets within the recovery area, i.e., the received signal is composed of a linear combination of delayed and weighted replicas of the transmitted pulse s(t) as follows:

$$x(t) = \sum_{i,j} \alpha_{i,j} s(t - \tau_{i,j}), \, 1 \le i \le I, \, 1 \le j \le J \quad \text{Equation (2D)}$$

where the weighting coefficients $\alpha_{i,j}$ represent signal attenuation and the time-shifting parameter $\tau_{i,j}$ model phase changes caused by different target properties and travel distances. In other words, the received signal x(t) is simply the output of an LTI system modeled by the reflection coefficients $\alpha_{i,j}$ and its sparsity is directly related to the complexity level of the scene. Suppose that there is a single perfect point source in the imaging area of interest and the resulting digitized samples at Nyquist rate of the received signal are stacked in a single column vector $s_0$. Define $s_i$ as the column vector containing all digitized samples at Nyquist rate of the received signal with the delay parameter $\tau_i$. Then, the collection of all of these column vectors will make up the time-delayed dictionary S that is employed in this preferred embodiment for signal sparsification where the increment in $\tau_i$ is set at the highest possible resolution that the hardware can support (at Nyquist sampling period). Then, further suppose that the received signal is sampled at the Nyquist rate, any collected digitized data record x can be represented as $$x=S\alpha=[s_0 s_1 s_2 \ldots s_N]\alpha \qquad (3D)$$

where $N\times 1$ column vector x is a length-N record, the $N\times(I\times J)$ matrix S is the redundant matrix whose columns contain the time-shifted versions of the transmitted signal s(t), and the $(I\times J)\times 1$ column vector $\alpha$ is the sparse vector of weighting coefficients. Significant coefficients in $\alpha$ indicate the existence of such objects. The positions and magnitude values of significant coefficients in $\alpha$ reveal the potential phase-shift (position) and amplitude information of significant targets. It is hypothesized that the record x is sparse in the dictionary S in the sense that there should only exist a finite number of significant coefficients in $\alpha$ which corresponds to the significant targets or objects within that local neighborhood. Hence, the compressive sensing problem in this case involves the solving of the following $l_0$ or $l_1$ optimization problem:

$$\alpha^*=\min|\alpha|0,1 \text{ such that } y=\Phi x=\Phi S\alpha. \qquad (8)$$

From equation (3D), the coefficients $\alpha$ can be computed from the measurements in x, which is over-sampled. However, since the receiver only measures y, which the sub-Nyquist version of x as described in Equation (1D), one needs to construct a corresponding sub-Nyquist version S' from the dictionary S. The following equation is presented:

$$S_i'=\Phi S_i \qquad (4)$$

where $S_i$ is the $i^{th}$ column of S while $S_i'$ is the $i^{th}$ column of S. Thus, S' is a $K\times N$ matrix that composes of the time-shifted versions of the transmitted waveform similar to the formation of S. However, each of the time-shifted columns $S_i'$ in S' is sampled at the sub-Nyquist rate using the same matrix $\Phi$ in the sensing stage that is employed to capture the received waveform. Once the sub-Nyquist dictionary is constructed, one can attempt to recover the coefficient vector $\alpha$ from the measurement vector y via solving the following inverse problem $$y=S'\alpha$$

There are two classes of available techniques for solving the inverse linear system of equations for the sparsest $\alpha$ in the compressed sensing community.

BASIS PURSUIT via linear programming (as described in E. Candès and T. Tao, "Decoding by linear programming," IEEE Trans. on Information Theory, vol. 51, no. 12, pp. 4203-4215 (December 2005) (hereby incorporated by reference) or gradient projection (as described in M. A. T. Figueiredo, R. D. Nowak, and S. J. Wright, "Gradient projection for sparse reconstruction: Application to compressed sensing and other inverse problems," IEEE Journal of Selected Topics in Signal Processing: Special Issue on Convex Optimization Methods for Signal Processing, vol. 1, no. 4, pp. 586-598 (April 2007) (hereby incorporated by reference);

MATCHING PURSUIT via orthogonal matching pursuit (as described in J. Tropp and A. Gilbert, "Signal recovery from random measurements via orthogonal matching pursuit," IEEE Trans. on Information Theory, vol. 53, no. 12, pp. 4655-4666 (December 2007) (hereby incorporated by reference)) regularized orthogonal matching pursuit (as described in D. Needell and R. Vershynin, "Signal recovery from incomplete and inaccurate measurements via regularized orthogonal matching pursuit," IEEE Journal of Selected Topics in Signal Processing, vol. 4, pp. 310-316 (April 2010) (hereby incorporated by reference)), subspace pursuit (as described further in W. Dai and O. Milenkovic, "Subspace pursuit for compressive sensing: Closing the gap between performance and complexity," IEEE Trans. on Information Theory, vol. 55, pp. 2230-2249 (May 2009) (hereby incorporated by reference)), sparsity adaptive matching pursuit (as described further in T. T. Do, L. Gan, N. H. Nguyen, and T. D. Tran, "Sparsity adaptive matching pursuit algorithm for practical compressed sensing," in Proc. Asilomar Conf. on Signals, Systems, and Computers, pp. 581-587, Pacific Grove (October 2008) (hereby incorporated by reference), etc.

In this implementation the orthogonal matching pursuit technique was employed as described in D. Needell and R. Vershynin, "Signal recovery from incomplete and inaccurate measurements via regularized orthogonal matching pursuit," *IEEE Journal of Selected Topics in Signal Processing. vol. 4*, pp. 310-316, (April 2010) (hereby incorporated by reference) to solve for a due to its simplicity, recovery robustness, and fast computation. Once the coefficients $\alpha$ are computed, the signal waveform x can be reconstructed using Equation (3D).

Time-Delay Sparse Signal Model and Dictionary Construction

In this approach, we construct the sparsifying dictionary from time-shifted versions of the transmitted probing signal s(t). Define (i, j) with $1\le i\le I$, $1\le j\le J$ as the pixel location of a reflective target in the recovery area. The received signal x(t) is simply the summation of reflections of all targets within the recovery area, i.e., the received signal is composed of a linear combination of delayed and weighted replicas of the transmitted pulse s(t) as follows:

$$x(t)=\Sigma \alpha_{i,j} s(t-\tau_{i,j}), 1\le i\le I, 1\le j\le J \qquad (6)$$

where the weighting coefficients $\alpha_{i,j}$ represent signal attenuation and phase changes caused by different travel distances and reflection angles. In other words, the received signal x(t) is simply the output of an LTI system modeled by the reflection coefficients $\alpha_{i,j}$ and its sparsity is directly related to the complexity level of the scene. Suppose that the received signal is sampled at the Nyquist rate, the collected digitized data record x can be represented as $$x=S\alpha \qquad (7)$$

where $N\times 1$ column vector x is a length-N record, $N\times(I\times J)$ matrix S is the redundant matrix whose columns are time-shifted version of the transmitted signal s(t), and $(I\times J)\times 1$ column vector $\alpha$ is the sparse vector of weighting coefficients. Significant coefficients in $\alpha$ indicates the existence of such objects. The position and magnitude value of significant coefficients in $\alpha$ reveals the potential position and shape information of significant targets. One can hypothesize that the record x is sparse in the dictionary S in the sense that there should only exist a few significant coefficients in $\alpha$ which corresponds to the significant targets or objects within that local neighborhood. Hence, the compressive sensing problem in this case involves the solving of the following $l_0$ or $l_1$ optimization problem:

$$\alpha^* = \min |\alpha|0,1 \text{ such that } y = \Phi x = \Phi S\alpha. \quad (8)$$

Two sensing schemes are now explored: (a) random projection; and (b) random sub-sampling with a slower analog-digital converter (ADC) clock rate. In the former case, the sensing matrix $\Phi$ in (8) above is chosen as a completely random matrix of Gaussian i.i.d entries and a series of dot products over the entire signal support are performed to yield the CS measurements y. In the latter case, samples are randomly selected of x as measurements y. Therefore, the sensing matrix $\Phi$ in this case is simply an identity matrix with randomly-deleted rows.

Orthogonal Matching Pursuit

Numerous recovery techniques in the current Compressed Sensing (CS) literature can be employed to solve the optimization problem in Equation (6). In a preferred embodiment, Orthogonal Matching Pursuit (OMP) was chosen due to its simplicity, recovery robustness, and fast computation. OMP is also very simple to set up: the only required parameter is the sparsity level K. Once the sparsest coefficient vector $\alpha$ is found, the raw data record is recovered as in Equation (7). All of the recovered data records are then supplied to the backprojection image formation algorithm to produce the final SAR image.

From Wikipedia, the matching pursuit algorithm is described as

Algorithm Matching Pursuit

```
Input: Signal: f(t), dictionary D.
Output: List of coefficients: (α_n, g_γn).
Initialization:
    Rf_1 ← f(t);
    n ← 1;
Repeat:
    find g_γn ∈ D with maximum inner product |⟨ Rf_n, g_γn ⟩ |;
    α_n ← ⟨ Rf_n, g_γn ⟩;
    Rf_{n+1} ← Rf_n - α_n g_γn;
    n ← n + 1;
Until stop condition (for example: ||Rf_n|| < threshold)
```

An extension of Matching Pursuit (MP) is its orthogonal version: Orthogonal Matching Pursuit (OMP). The main difference with MP is that coefficients are the orthogonal projection of the signal $f$ on the dictionary D. In fact, this algorithm solves the sparse problem:

$$\min_x \| f - Dx \|_2^2 \text{ such that } \| x \|_0 \leq N,$$

with $\|x\|_0$ the $L_0$ pseudo-norm equal to the number of non-zero elements of x.

Reconstruction Performance Using Simulated Data

In this section the results are shown using the simulated data. FIG. 9 shows the imaging geometry. In this data set, the radar is configured in side-looking mode. It travels in the horizontal direction, transmits impulses to the imaging area, and receives backscattered radar signals from the targets. In this scene, there are fifteen point targets that are arranged in three rows and five columns. Using the backprojection SAR image formation, SAR imagery is formed from radar collected along the synthetic aperture. FIG. 14 shows the SAR image for this simulation scenario. This SAR image is served as the baseline image for performance comparison purpose since the received radar data is sampled well above the Nyquist rate.

Next, a sub-Nyquist sampling case will be described. FIG. 10 shows an original radar record (smooth curve) that is sampled well under the required Nyquist sampling rate. The signal is randomly digitized at approximately 5% the original sampling rate. In FIG. 10, only 20 samples (shown by the diamonds) out of 200 original samples are digitized and recorded. Obviously, it is not possible to reconstruct the signal using conventional techniques. FIG. 11 shows the reconstructed waveform (red curve) vs. the original waveform (blue curve) using the linear interpolation technique. FIG. 12 shows the reconstructed waveform (red curve) vs. the original waveform (blue curve) using the higher-order (spline) interpolation technique. The classic interpolation techniques completely fail to reconstruct the signal since it is sampled at well above the Nyquist rate. FIG. 13 shows the reconstructed waveform (red curve) vs. the original waveform (blue curve) using our proposed model-based sub-Nyquist sampling and reconstruction technique. Although the reconstruction is not perfect, it performs much better than the classic interpolation techniques. The reconstruction preserves the structure and follows most of the peaks and valleys of the original waveform.

Also desirable is a comparison of the reconstruction performance in the SAR image domain. FIGS. 15, 16, and 17 show the three SAR images formed using the reconstructed data from the spline interpolation, linear interpolation, and the SMB-based reconstruction techniques, respectively. From the SAR images of FIGS. 15 and 16 using the interpolation techniques, the images are so noisy that we cannot resolve any target. Although the SAR image from FIG. 17 using the (SMB technique) sub-Nyquist sampling and reconstruction technique shows the higher sidelobe level than that of the baseline SAR image of FIG. 9, all 15 targets can be easily resolved. In FIG. 17, the same SAR image of FIG. 16 is displayed in reduced dynamic range (15 dB instead of 40 dB) shows that all targets can be detected without any false alarm.

Reconstuction Performance Using Data from the ARL UWB Radar

Algorithms are tested and compared using the data from the ARL UWB low-frequency forward-looking SAR radar. The system is a time-domain impulse-based radar that transmits narrow pulses that occupy the frequency spectrum from 300 MHz to 3000 MHz. The radar has two transmitters and an array of 16 receivers to form a physical aperture in the forward-looking mode, The radar range swath is from 8 to 33 m. In-depth detail of the radar system is discussed in Ressler, Marc et al., "The Army Research Laboratory (ARL) Synchronous Impulse Reconstruction (SIRE) Forward-Looking Radar," Proceedings of SPIE, Unmanned Systems Technology IX, Vol. 6561, (May 2007), hereby incorporated by reference. After the return radar signals are captured and digitized by the receivers, a series of signal processing algorithms are performed on the data to mitigate noise and other artifacts. The processed data are then sent to the image formation algorithm to form 2D SAR imagery. ARL has developed the RSM technique (as described in U.S. Pat. No. 7,796,829, hereby incorporated by reference) that integrates with the standard backprojection image formation to achieve significant sidelobe and noise reduction in SAR imagery. The ARL report Lam Nguyen, "Signal and image processing algorithms for the U.S Army Research Laboratory ultra-wideband (UWB) synchronous impulse reconstruction (SIRE) radar," Army Research Laboratory Technical Report, ARL-TR- 4784, April 2009, hereby incorporated by reference, describes all the signal processing and image formation algorithms employed to produce SAR imagery.

FIG. 18 shows a baseline SAR image formed using data from the ARL UWB radar in forward-looking mode using 100% of over sampling data (7720 Gigasamples/sec). As an example, the SAR image covers an area of 25 meters in the cross-range direction and approximately 20-24 meters in the down-range direction.

There are nine small test targets in the center of the scene, and other large man-made and natural clutter objects along both sides. This is the best quality image, that can be generated using 100% of over-sampled data with the signal and image formation techniques.

Next, the under-sampled data set (1.544 Giga samples/sec) is considered by re-sampling the raw radar data at 20% of the original sampling rate, which is well under the Nyquist rate. Using the standard interpolation technique for waveform reconstruction, the SAR image is formed from the under-sampled data set. FIG. 17 shows the corresponding SAR image, which has very poor quality. The SAR image is very noisy; none of the targets can be detected.

Finally, the reconstruction of the under-sampled data set (1.544 Giga samples/sec) is examined using the proposed SMB technique. The SMB reconstruction technique is then applied to the sub-Nyquist sampling data records, and the SAR image is formed via time-domain back-projection as usual. In other words, our technique recovers the raw radar data directly before passing them over to the image formation process. The SMB reconstruction technique described above requires a dictionary that is formed using the time-shifted waveforms of the received signal from a point target. Since this basis waveform (the actual transmit waveform filtered by the system transfer function) is not available, this waveform is estimated by generating an analytical wideband signal that covers the same frequency spectrum of the radar transmit pulse. This analytical wideband waveform is employed in the dictionary S for the reconstruction of the real radar data. Surprisingly, the reconstruction for the real radar data works quite well even with the analytical time-delayed dictionary. The performance is expected to be even superior if the real response from a point target is measured and employed in the dictionary construction.

FIG. 20 shows the SAR image reconstruction using the SMB technique. The reconstruction performs very well. All nine small targets are reconstructed with high fidelity. The SAR background noise level is comparable to the original over-sampled data (FIG. 18). There are some small isolated areas where the noise speckles are slightly higher than the original image. Overall, the SAR image reconstruction using the proposed technique achieved excellent performance in this real and challenging scenario using under-sampled data (20%). It is worthwhile to note here that the reconstruction of the SAR image of a real scene (FIG. 20) using the SMB technique depends completely on a synthesized dictionary that composes of time-shifted versions of one single simulated waveform. In other words, the SMB technique successfully modeled and recovered a challenging real-world scene (with a variety of targets spanning across a wide dynamic range) using only a handful of reflection coefficients based on a fraction of information available (sub-Nyquist sampling data records).

In-depth detail of the signal processing and image formation of the SIRE radar system is discussed in Lam Nguyen, "Signal and Image Processing. Algorithms for the Army Research Lab Ultra-Wideband Synchronous Impulse Reconstruction (UWB SIRE) Radar," ARL Technical Report, ARL-TR-4784, (April 2009), hereby incorporated by reference. The SAR image shows the road (the dark area in the middle of the image) where the radar travels along, and the bushes and other man-made and natural clutter objects along both sides of the road. For this study, although the radar data was sampled and collected at above the Nyquist rate using the SIRE data acquisition technique, the original radar records were re-sampled using the random sub-sampling technique. The model-based sparse sampling reconstruction technique is then applied to the sub-sampling data records, and the SAR image is formed. The model-based sparse reconstruction technique described above requires a dictionary that is formed using the time-shifted waveforms of the received signal from a point target. Since this basis waveform is not available, the analytical wideband waveform was employed that is used in simulation data for the reconstruction of the real radar data. Surprisingly, the reconstruction for the real radar data works quite well even with the analytical basis waveform. FIG. 19 shows a segment of a down-range radar data record reconstructed using the model-based sparse sampling reconstruction technique with 20% of the original samples. The reconstruction performs well in this case. The SAR image of FIG. 20 is formed using the reconstructed down-range data with 20% of the original data samples. Compare this to the original baseline image of FIG. 18; note that while the sidelobe level is slightly higher in the reconstructed SAR image, the target signatures in both images are very similar in both shapes and amplitudes. Even small radar-cross-section (RCS) targets shows up well in the reconstructed SAR image.

Although the emerging Compressed Sensing (CS) theory offers a new approach in data acquisition and offers the data compression feature, it still does not address the drawback that data acquisition must be operated in equivalent time since many measurements (or projections) are required as depicted by the sensing matrix $\Phi$ in the CS framework. In the foregoing, the model-based sub-Nyquist sampling and reconstruction technique that allows us to sample and reconstruct wide-bandwidth radar signals in real-time (not equivalent time) with the sampling rate that is well below the required Nyquist rate. The results showed that the reconstruction technique performs well while the conventional interpolation methods completely failed. The reconstruction for the real radar data works well even with the analytical basis waveform.

Orthogonal Matching Pursuit

Returning to sparcity problem, let x be a signal of length N, it is said to be K-sparse if x only has K<<N significant (non-zero) entries, i.e., $\|x\|_0 = K$. Such a signal can be acquired through a series of incoherent linear projections $y = \Phi x$ where the m×1 vector y contains M measurements (discrete "samples" of the signal x) while $\Phi$ represents the M×N incoherent sensing matrix, usually constructed from random Gaussian matrices. Under some mild assumptions, the compressed sensing theory shows that the sparse signal x can be faithfully recovered from $M = O(K \times \log N)$ measurements with very high success probability by solving the following optimization problem.

$$\min \|x\|_1 \text{ subject to } y = \Phi x \qquad \text{Equation (1B)}$$

The above convex minimization problem can be solved easily via traditional linear programming techniques. In real-life large-scale applications, (1B) can be more efficiently solved using fast algorithms such as gradient projection and iterative shrinkage thresholding. Alternatively, various heuristic greedy algorithms have also been developed; most prominent amongst them is orthogonal matching pursuit (OMP).

Two issues that often, arise in practice are (i) the space that signal sampling is carried out is often not necessarily sparse (the signal of interest x is most likely sparse in another domain); and (ii) measurements are often contaminated by a certain level of noise, say of variance σ. To address both of these issues, one can attempt to solve the following optimization problem instead $$\min\|\Psi_x\|_1 \text{ subject to } \|y-\Phi x\|_2 \leq \sigma \quad \text{Equation (3B)}$$

where the operator Ψ can be thought of as the sparsifying transform, or frame, or dictionary for x (here Ψ can be chosen as a concatenation of a long list of popular fixed linear transforms such as Fourier, cosine, Gabor, and wavelet). This is commonly referred to as analysis-based CS in the literature, as described further in S. Becker, et al., "NESTA: a Fast and Accurate First-order Method for Sparse Recovery," *SIAM J. on Imaging Sciences*, 4, 1-39 (2011), hereby incorporated by reference. For the present application and SAR data set, utilizing NESTA and selecting the Fourier transform as Ψ and the sensing matrix Φ as a random matrix whose entries being i.i.d. random variables generated from a Gaussian distribution offers the best and most robust recovery performance that CS can offer.

From a practical sensing point-of-view, the aforementioned random Gaussian matrix that performs random projections does not immediately lead to lower-cost slower-clock data acquisition unless it is, implemented directly in the analog domain as an analog operator. While there have been numerous efforts in the CS hardware design, it is believed that CS-based A/D converters only exist in research labs. To realize true sub-Nyquist under-sampling, a radically different approach is taken in relying on currently available off-the-shelf inexpensive A/D converters with a slower sampling clock to capture SAR data. Therefore, a proposed technique only requires minor modifications to the current ARL UWB SAR system's hardware. To recover raw SAR data records at high rates, instead of relying on the traditional approach of interpolation or the recent CS approach with a certain sparsifying transform, a sparsity-driven optimization approach is chosen based on an appropriate physical model—each radar data record is modeled as a superposition of many backscattered signals from reflective point targets in the scene.

Model-Based SAR Sparse Recovery from Uniformly Under-Sampled Measurements

Using this approach, by hypothesis the optimal sparsifying redundant frame Ψ for the receiving SAR signal x(t) is the over-complete dictionary consisting of numerous time-shifted versions of the transmitted probing signal s(t). More specifically, the received signal x(t) is modeled as the summation of all reflections from all targets within the recovery area. The received signal is reconstructed or derived from a linear combination of delayed and weighted replicas of the transmitted pulse s(t) as follows $$x(t)=\Sigma \alpha_i s(t-\tau) \quad \text{Equation (6B)}$$

where weighting coefficients $\alpha_i$ represent signal attenuation and time-shift parameters $T_i$ model phase changes caused by different physical material properties, travel distances, and reflection angles in the returned signal. In the discrete setting, suppose that the received signal x is already sampled at the Nyquist rate, then x can be compactly represented as $$x=S\alpha \quad \text{Equation (7B)}$$

where the N×1 column vectors is the signal of interest, the N×I matrix S is the redundant dictionary whose I columns are timeshifted version of the transmitted signal s(t), and the I×1 column vector α is the sparse vector of weighting coefficients. Significant elements in α indicate the existence of significant object(s) in the scene. The position and magnitude value of significant coefficients in a reveal the potential position and shape information of those significant targets. The record x is sparse in the dictionary S in the sense that few significant coefficients in a correspond to significant targets or objects within that local neighborhood. Hence, the sparse recovery problem in this case involves solving the following $l_0$ optimization problem:

$$\min\|x\|_0 \text{ subject to } y=\Phi S\alpha \quad \text{Equation (8B)}$$

Here, the sparsity level K in the sparse recovery process is directly related to the complexity level of the scene. If K is kept fixed throughout all data records, then one is only interested in at most K significant point targets in any particular scene. Numerous recovery techniques in the current CS literature can be employed to solve the optimization problem in Equation (8B), including the $l_i$ relaxation approaches. The Orthogonal Matching Pursuit (OMP) may be chosen due to its simplicity, recovery robustness, and fast computation. OMP is a very simple to set up: the only required parameter is the sparsity level K. Once the sparsest coefficient vector α is found, the raw data record is recovered as in Equation (7B). All of the recovered data records are then supplied to the time-domain back-projection image formation algorithm to produce the final SAR image.

Results

Operative sensing schemes include (i) random Gaussian projection which has been proven to offer the best recovery performance for traditional CS; and (ii) uniform sub-sampling with a much slower ADC clock rate. In the former case, elements of the sensing matrix Φ are chosen as independent and identically distributed (i.i.d.) Gaussian random variables. In the latter case, the sensing matrix is chosen as $\Phi=I_T$ where T={kM, k Z]} and M is the sub-sampling factor. This simply yields uniform regular under-sampled which can be easily accomplished with an inexpensive ADC. For signal recovery, three options are explored: (i) analysis CS recovery via NESTA, as described in S. Becker, et al., "NESTA: a Fast and Accurate First-order Method for Sparse Recovery," *SIAM J. on Imaging Sciences*, 4, 1-39 (2011) (hereby incorporated by reference) where the sparsifying transform Ψ is chosen as the DFT matrix; (ii) traditional spline interpolation to attempt to recover high-resolution signal x from low-resolution regular samples y; and (iii) the proposed time-delay model-based redundant dictionary approach as described in E. J. Candès and M. Wakin, "An introduction to compressive sampling," IEEE Signal Processing Magazine, vol. 25, no. 2, pp. 21-30, March 2008, J. Tropp and A. Gilbert, "Signal recovery from random measurements via orthogonal matching pursuit," IEEE Trans. on Info. Theory, vol. 53, no. 12, pp. 4655-4666, December 2007, and S. Becker, et al., "NESTA: a Fast and Accurate First-order Method for Sparse Recovery," *SIAM J. on Imaging Sciences*, 4, 1-39 (2011) (all of which are hereby incorporated by reference).

Algorithms were tested and compared using the data from the ARL UWB low-frequency forward-looking SAR radar. The system is a time-domain impulse-based radar that transmits narrow pulses that occupy the frequency spectrum from 300 MHz to 3000 MHz. The radar has two transmitters and an array of 16 receivers to form a physical aperture in the forward-looking mode. The radar range swath is from 8 to 33 m. In-depth details of the radar system are discussed in Ressler, L. Nguyen, F. Koenig, D. Wong, and G. Smith, "The Army Research Laboratory (ARL) Synchronous Impulse Reconstruction (SIRE) Forward-Looking Radar," Proc. SPIE, Unmanned Systems Technology IX, Vol. 6561, May 2007, hereby incorporated by reference. After the returned radar signals are captured and digitized by the receivers, a series of signal processing algorithms are performed on the data to mitigate noise and other artifacts. The processed data are then sent to the image formation algorithm to form 2D SAR imagery. ARL has developed the novel RSM technique that integrates with the standard back-projection image formation to achieve significant side-lobe and noise reduction in SAR imagery. The ARL report L. Nguyen, "Signal and Image Processing Algorithms for the Army Research Lab Ultra-Wideband Synchronous Impulse Reconstruction (UWB SIRE) Radar," ARL Technical Report, ARL-TR-4784, April 2009, hereby incorporated by reference, describes all the signal processing and image formation algorithms employed to produce SAR imagery.

FIG. 21 shows a SAR image formed using data from the ARL UWB radar in forward-looking mode using 100% of over-sampling data (7.720 Giga-samples/sec). The SAR image covers an area of 25 meters in the cross-range direction and 24 meters in the down-range direction. There are nine small test targets in the center of the scene, and other large man-made and natural clutter objects along both sides. This benchmark offers the best quality image that we can generate using 100% of over-sampled data with the signal and image formation techniques described in L. Nguyen, "Signal and Image Processing Algorithms for the Army Research Lab Ultra-Wideband Synchronous Impulse Reconstruction (UWB SIRE) Radar," *ARL Technical Report, ARL-TR*-4784, April 2009.

The over-sampled data are also used by the Gaussian projection compressed sensing scheme. In this case, the data reconstruction is based on a few measured (projected) samples, which make up 20% of the original data samples. It is important to note here that although this compressed sensing data acquisition scheme results in data bandwidth reduction (reconstruction is based on the number of projected samples rather than the original data samples), the Gaussian projection still requires that each data record is digitized at the original over-sampled rate (7.720 Giga-samples/sec). FIG. 22A shows the SAR image using the standard compressed sensing framework. From FIG. 22A, although a few targets are detectable (with very high false alarm rate), the overall SAR image quality is very poor Next, the under-sampled data set (1.544 Giga samples/sec) is considered, which is well under the Nyquist rate. Using the standard interpolation technique for waveform reconstruction, the SAR image is formed from the under-sampled data set. FIG. 22B shows the corresponding SAR image, which has very poor quality. The SAR image is very noisy; none of the targets can be detected.

Finally, the reconstruction of the under-sampled data set was tested using the proposed SMB technique. The reconstruction method performed quite well in this case. Since the probing waveform (the actual transmitted waveform filtered by the overall system transfer function) is not available, this waveform was estimated by generating an analytical wideband signal that covers the same frequency spectrum of the radar transmit pulse. FIG. 22C shows the SAR image reconstruction using the SMB technique. The reconstruction performs very well. All nine small targets are reconstructed with high fidelity. The SAR background noise level is comparable to the original over-sampled data as shown in FIG. 21. There are some small isolated areas where the noise speckles are slightly higher than the original image. Overall, the SAR image reconstruction using the proposed technique achieved excellent performance in this real and challenging scenario using under-sampled data (20%).

FIGS. 23A-C compares the SAR images using various algorithms as in FIG. 22. However, the reconstruction is based on only 10% of the original data. Although the SMB reconstruction of FIG. 23C still outperforms other techniques (depicted in FIGS. 23A and 23B), the signal-to-noise (SNR) ratio reduces significantly. The nine targets are still detectable but at a higher false alarm rate.

In summary, the preferred embodiments comprise a novel robust sparse-recovery technique that allows the sub-Nyquist uniform under-sampling of wide-bandwidth radar data in real-lime (single observation). Although much of the information is lost in the received signal due to the low sampling rate, a robust signal recovery is obtained via modeling the received radar waveform as a superposition of many backscattered signals from reflective point targets in the scene. The proposed SMB technique is based on direct sparse recovery via OMP using a special dictionary containing many time-delayed versions of the transmitted probing signal. The technique allows the use of existing commercial-off-the-shelf (COTS) hardware and architecture. The algorithm was tested using real radar data from the U.S. Army Research Laboratory (ARL) Ultra-Wideband (UWB) synthetic aperture radar (SAR). The sparse-recovery model-based SMB technique successfully models and synthesizes the returned radar data from real scenes using a handful of coefficients and an analytical waveform that models the transmitted signal. SAR image quality from only 20% under-sampled data is essentially the same as the quality obtained from the original over-sampled data.

Possible uses of the invention include remote sensing applications such as target detection, anomaly detection, range detection, imaging radar, other remote sensors, communication systems, medical imaging systems, natural resource management, planning and monitoring. Using the concepts of the present invention, lost information from sub-Nyquist sampling may be recovered using sparsity modeling technique. The present invention allows the use of relatively inexpensive ADCs to capture wide bandwidth signals in real-time (not equivalent time). The preferred embodiment sampling technique affords data compression which facilitates reducing transmission bandwidth, particularly for sensors or networks of sensors. The preferred embodiment SMB technique can be used to extrapolate information. Once the SMB can successfully model data based upon a fraction of available information (sub-Nyquist data) it can further estimate and/or synthesize other information that might otherwise not exist in the input data.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other Signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software embodiments. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

As used herein "processor" may include but is not limited to a computer, central processing unit (CPU), microprocessor, multiprocessor, main frame computer, personal computer, or laptop computer.

As used herein, the terminology "sparsity driven" of "sparsity-driven" is a relative term relating to the finding of a compressible solution which is intended to be treated broadly. For example, a sparse matrix is a matrix with enough zeros that it pays to take advantage of them; commonly interpreted from an economics view point in that if one can save time and memory by exploiting the zeros, then a matrix is sparse. The terminology sparsity refers to the selection of a model, within a hierarchy of model classes, that yields a compact representation; i.e. a model that depends on only a few of the observations, selecting a small subset of features for classification or visualization. Selection of an optimal representation which is sufficiently sparse enables efficient computation by optimization techniques and alleviates the extreme difficulty encountered without sufficient sparsity.

As used herein, the terminology "target" area means area of interest, which may be, for example, a scene, an animal or human body or portion thereof, face (as in face recognition), object, ground region, field, landscape, aerial environment, or a combination thereof.

The term "noise" as used herein relates to observation noise. There are many sources that cause noise in the resulting observed signal. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets.

As used herein, the terminology "dictionary" means an organized listing of data stored in machine-readable form for reference.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system of reconstructing data signals from one of incomplete, compressed or sparse measurements comprising:
   a receiver for receiving data signals from a target area,
   an analog to digital conversion system operatively connected to the receiver, the analog to digital conversion system digitizes a received data signal at a slower rate than a Nyquist minimum sampling rate to obtain a sub-Nyquist digitized output;
   first and second dictionaries for storage of a plurality of time shifted data recovered from previously transmitted signals; the first dictionary operating to store time shifted versions of previously transmitted signals which are sampled above the Nyquist minimum sample rate; the second dictionary operating to store time shifted versions of previously transmitted signals which are sampled below the Nyquist minimum sample rate, and
   at least one processor for reconstruction of waveform signals; the at least one processor operating to transform the sub-Nyquist digitized output from the analog to digital conversion system into an approximation of the received data signal using the first and second dictionaries to produce reconstruct the data signal.

2. The system of claim 1 wherein the receiver comprises a single sensor that provides a received analog signal to the analog to digital conversion system and regular uniform sampling of the analog to digital conversion system records undersampled signal measurements and, wherein the at least one processor operates to recover the received signal using one of orthogonal matching pursuit, basis pursuit, gradient projection, matching pursuit, orthogonal matching pursuit, regularized matching pursuit or subspace pursuit.

3. The system of claim 2 wherein the first dictionary comprises transmitted signals in which a signal to be recovered x can be represented as x=Sα where x represents column vectors containing Nyquist length records and matrix S is a redundant matrix whose columns contain time shifted versions of the transmitted signal and α is the sparse vector of weighting coefficients wherein significant coefficients reveal potential phase-shift and amplitude information of significant targets, and wherein the second dictionary is a sub-Nyquist dictionary comprising transmitted signals which can be represented as y=S'α, where S'=ΦS is the sub-Nyquist version of S, and Φ is a sampling matrix and y=Φx.

4. The system of claim 3 wherein the second dictionary can be represented by S' and is a corresponding sub-Nyquist version of the first dictionary represented by S constructed such that $$S'_i = \Phi S_i$$

where $S_i$ is the $i^{th}$ column of S while $S'_i$ is the $i^{th}$ column of S', and S' is a (K×N) matrix that comprises time-shifted versions of a transmitted waveform similar to the formation of S except that each of the time-shifted column $S'_i$ in S' is sampled at the sub-Nyquist rate using a matrix Φ in the sensing stage that is employed to capture a received waveform, where K is the number of data samples collected by the receiver, where i is a positive integer between 1 and N, indexing the columns of the dictionaries and where Φ resembles an identity matrix I, where the value of any element along the diagonal line of the Φ matrix is one and the value of any other element of the Φ matrix is zero, except that only K samples (K<<N) are digitized from an input signal such that the rows of Φ form a subset of the rows of the identity matrix I and the size of Φ is (K×N) as only K rows from the identity matrix I are selected.

5. The system of claim 4 wherein the selection of K rows from N rows of the identity matrix I could be derived from randomized selection or from any uniformly-spaced interval, which results in K digitized signal samples stored in a vector which lies directly on an original analog signal x(t).

6. The system of claim 5 wherein the matrix Φ can be initialized once and be used among many records, or changed from one record to the next, but must be used in both signal sampling and signal reconstruction.

7. The system of claim 1 wherein the first and second dictionaries are coherent and the first dictionary comprises a matrix of digitized samples of a transmitted waveform at the Nyquist minimum sample rate stacked in column vectors, each column vector associated with an incremental delay, and wherein the incremental delay is substantially the highest increment possible that the system can support without an ineffective signal being produced.

8. The system of claim 1 wherein a linear combination for reconstruction of the signal is solved using an orthogonal matching pursuit technique wherein as α is optimized such that y=Φx=ΦSα, where α is the sparse vector of weighting coefficients wherein significant coefficients reveal potential phase-shift and amplitude information of significant targets, and wherein the matrix Φ is selected as a substantially random collection of rows of an identity matrix and samples of x are randomly and directly selected as measurements y.

9. The system of claim 1 wherein the first and second dictionaries are matrices which are constructed from time-shifted versions of a transmitted waveform of radar at two different sampling rates, the sampling rate for the first dictionary being above the Nyquist minimum sample rate and the sampling rate for the second dictionary being below the Nyquist minimum sample rate such that the columns of both matrices are constructed from digitized samples of the time-shifted transmitted waveform at different resolutions.

10. The system of claim 1 wherein a linear combination used for reconstruction of the signal comprises the use of time-shifted and weighted replicas of the received signal, where the weighting correlates to signal attenuation and the time shifting utilizes at least one parameter to model phase changes caused by different target properties and travel distances.

11. The system of claim 1 wherein the first and second dictionaries are adaptable to the transmitted data signals having different waveforms so as to be capable of storing time shifted versions of various different signal waveforms having a bandwidth range of approximately 300-3000 MHz, and wherein the at least one processor comprises a waveform reconstruction processor and wherein a real signal emitted from a radar transmitter is measured and employed in the construction of the first and second dictionaries.

12. The system of claim 1 wherein the at least one processor is a waveform reconstruction processor and the first dictionary can be represented by S where a received signal x(t) is sampled at the Nyquist minimum sample rate, the collected digitized data record can be represented as x=Sα, where (N×1) column vector x is a length-N record, the N×(I×J) matrix S is a redundant matrix whose columns contain time-shifted versions of a transmitted signal s(t) and an (I×J)×1 column vector, and α is the sparse vector of weighting coefficients and where (i, j) is defined as the coordinates of a pixel location of a reflective target in the recovery area with 1<i<I, 1<i<J.

13. The system of claim 1 wherein the first and second dictionaries comprise digitized signal vectors x and y, and wherein the digitized signal vector y is equal to Φ times the vector x, where Φ is a sampling matrix, and where the value of any element along the diagonal line of the matrix Φ is one and the value of any other element is zero, and in the case where the number of samples collected by the receiver and digitized is K (K<<N), where N is equal to the samples obtained at the Nyquist minimum sample rate, the size of the matrix Φ is K×N and only K rows from the identity matrix are selected, and wherein the same matrix Φ is used for signal sampling and signal reconstruction.

14. The system of claim 1 wherein the receiver comprises at least one radar sensor and wherein the analog to digital conversion system comprises a plurality of analog-to-digital converters each having an independent clock and operating in asynchronous fashion, each analog-to-digital converter operating on the output of the at least one radar sensor and collecting samples at uniform interval below a Nyquist minimum sample rate using the independent clock.

15. A method for reconstructing data signals from one of incomplete, compressed or sparse measurements comprising:
providing a receiver for receiving data signals from a target area,
providing an analog to digital conversion system operatively connected to the receiver, the analog to digital conversion system digitizing a received data signal at a slower rate than a Nyquist minimum sampling rate to obtain a sub-Nyquist digitized output, creating first and second dictionaries for storage of a plurality of time shifted data recovered from previously transmitted signals; the first dictionary operating to store time shifted versions of previously transmitted signals which are sampled above the Nyquist minimum sample rate; the second dictionary operating to store time shifted versions of previously transmitted signals which are sampled below the Nyquist minimum sample rate, providing at least one processor for reconstruction of waveform signals; the at least one processor operating to transform the sub-Nyquist digitized output from the analog to digital conversion system into an approximation of the received data signal using the first and second dictionaries to produce the data signal.

16. The method of claim 14 wherein the first dictionary can be represented by S where S is a redundant matrix whose columns contain the time-shifted versions of a transmitted signal s(t), and where the first dictionary is used to represent vectors x representing Nyquist length records and the second dictionary can be represented by S' where S'=ΦS is used to represent sub-Nyquist vectors y and wherein the signal is reconstructed using the sparsity driven inverse problem $$\alpha^* = \arg\min|\alpha|_{0,1} \text{ such that } y = \Phi S \alpha$$

where $\alpha$ is a sparse vector of weighting coefficients, $\alpha^*$ is the optimal $\alpha$, S is a redundant matrix whose columns contain the time-shifted versions of a transmitted signal s(t), $\Phi$ is a sampling matrix, and wherein the sparsity driven inverse problem is solved using one of orthogonal matching pursuit, basis pursuit, gradient projection, matching pursuit, orthogonal matching pursuit, regularized matching pursuit or subspace pursuit.

17. The method of claim 16 wherein the first and second dictionaries are coherent and comprise vectors x and y, respectively, representing a plurality of time shifted responses representing a transmitted data signal; the first dictionary comprising time shifted versions of transmitted signals which are sampled above the Nyquist minimum sample rate; the second dictionary comprising time shifted versions of transmitted signals which are sampled below the Nyquist minimum sample rate and wherein the signal is reconstructed using at least one processor for reconstruction of the waveform signals; the at least one processor operating to transform a sub-Nyquist digitized output into a real time data signal using the first and second dictionaries to produce a data signal as a linear combination of previously observed and weighed replicas of a transmitted data signal.

18. The method of claim 17 wherein reconstruction of a received signal comprises solving the $L_0$-norm optimization problem in the following equation $$\hat{\alpha}_{ij} = \arg\min\|\alpha_{ij}\|_0 \, s.t. \, y_{ij} = \Phi_{ij} S \alpha_{ij}$$

wherein the sparsest approximation possible of the vector records $y_{ij}$, data samples collected at the jth receiver containing echoes from a signal previously transmitted by the ith transmitter, is found as a linear combination of the corresponding vectors records $x_{ij}$ represented by the first dictionary S, where $\alpha_{ij}$ is a sparse vector of weighting coefficients, $\hat{\alpha}_{ij}$ is the optimal $\alpha_{ij}$, $\Phi_{ij}$ is a sampling matrix, and wherein the sparsity driven inverse problem is solved using one of orthogonal matching pursuit, basis pursuit, gradient projection, matching pursuit, orthogonal matching pursuit, regularized matching pursuit or subspace pursuit.

19. The method of claim 16 wherein the first and second dictionaries are coherent dictionaries, the first dictionary comprising vectors representing a received data record x as x=Sα where x represents column vectors containing Nyquist length records and matrix S is a redundant matrix whose columns contain time shifted versions of the transmitted signal and α is the sparse vector of weighting coefficients wherein significant coefficients reveal potential phase-shift and amplitude information of significant targets, and wherein the second dictionary is a sub-Nyquist dictionary defined as y=S'α, where y is the sub-Nyquist version of x and S'=ΦS is the sub-Nyquist version of S, and Φ is a sampling matrix and y=Φx.

20. The method of claim 16 wherein the reconstruction of a received data signal further comprises using linear combination of previously recorded transmitted signals for signal recovery by using an orthogonal matching pursuit technique wherein α is optimized such that y=Φx=ΦSα and wherein the matrix Φ is selected as a substantially random collection of rows of an identity matrix I and samples of x are randomly and directly selected as measurements of y.

* * * * *